US009633197B2

(12) United States Patent
Lakshmanan et al.

(10) Patent No.: US 9,633,197 B2
(45) Date of Patent: Apr. 25, 2017

(54) SYSTEMS AND METHODS FOR DEVICE DETECTION AND AUTHORIZATION IN A IOT FRAMEWORK

(71) Applicant: Verisign, Inc., Reston, VA (US)

(72) Inventors: Ashvatth Lakshmanan, Arlington, VA (US); Eric Osterweil, Farifax, VA (US); Andrew Fregly, Reston, VA (US)

(73) Assignee: Verisign, Inc., Reston, VA (US)

( * ) Notice: Subject to any disclaimer, the term of this patent is extended or adjusted under 35 U.S.C. 154(b) by 0 days.

(21) Appl. No.: 14/640,489

(22) Filed: Mar. 6, 2015

(65) Prior Publication Data
US 2016/0259932 A1 Sep. 8, 2016

(51) Int. Cl.
*H04L 12/22* (2006.01)
*G06F 21/44* (2013.01)
*H04L 29/12* (2006.01)
*H04W 4/02* (2009.01)
*H04W 4/04* (2009.01)
*G06F 21/30* (2013.01)
*H04W 4/00* (2009.01)

(52) U.S. Cl.
CPC .......... *G06F 21/44* (2013.01); *H04L 61/1511* (2013.01); *H04L 61/3025* (2013.01); *H04W 4/028* (2013.01); *H04W 4/04* (2013.01); *H04L 61/305* (2013.01); *H04W 4/005* (2013.01); *H04W 4/008* (2013.01)

(58) Field of Classification Search
None
See application file for complete search history.

(56) References Cited

U.S. PATENT DOCUMENTS

| | | | | |
|---|---|---|---|---|
| 8,180,366 B2* | 5/2012 | Ernst | .............. | H04L 12/585 455/3.02 |
| 2008/0248815 A1* | 10/2008 | Busch | .............. | H04W 4/02 455/456.5 |
| 2009/0070030 A1* | 3/2009 | Isoda | .............. | G06F 17/30864 701/408 |
| 2012/0142378 A1 | 6/2012 | Kim et al. | | |

(Continued)

OTHER PUBLICATIONS

A Regular Path Recognition Method and Prediction of User Movements in Wireless Networks. Erbas et al.2001.*

(Continued)

*Primary Examiner* — Venkat Perungavoor
(74) *Attorney, Agent, or Firm* — Artegis Law Group, LLP

(57) ABSTRACT

Provided herein are a method, a device, and a computer-readable medium operable to perform a method of automatically admitting a device to a network. The method can include receiving, from the one or more authorized devices in the network, first data that is associated with one or more sensing modalities, wherein the one or more sensing modalities are detected by the one or more of the one or more of the authorized devices during a defined time window; identifying a new device to be admitted to the network; constructing a time sequence of proximity events of the new device, within the defined time window, based on the first data; determining that the time sequence of the proximity events matches an expected time sequence of expected of proximity events; and admitting the new device to the network based on the determining.

32 Claims, 18 Drawing Sheets

(56) References Cited

U.S. PATENT DOCUMENTS

| | | | |
|---|---|---|---|
| 2013/0132566 A1* | 5/2013 | Olsen | H04W 4/025 709/224 |
| 2013/0226320 A1 | 8/2013 | Berg-Sonne et al. | |
| 2014/0154975 A1 | 6/2014 | Lambert et al. | |
| 2014/0188638 A1* | 7/2014 | Jones | H04M 1/72569 705/16 |
| 2015/0006695 A1* | 1/2015 | Gupta | H04L 41/32 709/223 |
| 2015/0245189 A1* | 8/2015 | Nalluri | G06Q 50/265 455/404.1 |
| 2015/0281891 A1* | 10/2015 | Umetani | H04W 4/021 455/456.1 |
| 2015/0332523 A1* | 11/2015 | Ranasinghe | H04W 24/10 701/34.2 |

OTHER PUBLICATIONS

Real-Time Wireless Lcoation and Tracking Systems with Motion Pattern Detection. Abreu et al. 2014.*
Extended European Search Report Application No. 16158643.3, dated May 18, 2016, 8 pages.

* cited by examiner

SYSTEMS AND METHODS FOR DEVICE DETECTION AND AUTHORIZATION IN A IOT FRAMEWORK

BACKGROUND

The use of the Internet for purposes that extend beyond the current model of Web browsers interacting with Websites is growing rapidly. In particular, many devices are now being exposed on the Internet so as to enable interactions with those devices from devices and applications that are also connected to the Internet. As a result of this increasing usage of the Internet for interaction with connected devices, commonly called the Internet of Things (IOT), there is a growing demand for technology that enables these interactions to be performed securely in a way that protects the privacy of the data being exchanged in the interactions.

SUMMARY

In some aspects, a method for automatically admitting a device to a network is provided. The method can comprise receiving, from the one or more authorized devices in the network, first data that is associated with one or more sensing modalities, wherein the one or more sensing modalities are detected by the one or more of the one or more of the authorized devices during a defined time window; identifying a new device to be admitted to the network; constructing a time sequence of proximity events of the new device, within the defined time window, based on the first data; determining that the time sequence of the proximity events matches an expected time sequence of expected of proximity events; and admitting the new device to the network based on the determining.

The method can further comprise receiving, from the new device, second data associated with the one or more sensing modalities associated with the new device during the defined time window. The time sequence of proximity events of the new device can comprise the second data. Constructing the time sequence of proximity events of the new device can further comprise determining a path through a physical location associated with the network, wherein a physical location of the one or more authorized devices in the network forms the path. The determining the path can be based on the first data and the second data. The one or more modalities can comprise one or more of: temperature, visual, audio, heat, motion, particulate concentration, etc.

The method can further comprise determining, after a time period, that the new device has not remained in proximity to the physical location of the network; and removing the new device from the network.

The determining the path can comprise comparing a portion of the second data from the new device to a portion of the first data from one of the one or more authorized devices; and determining, based on the comparison, a location of the new device relative to the one of the one or more authorized devices.

The identifying the new device to be admitted to the network can further comprise receiving a network discovery signal from the new device; and providing an activation signal to the one or more authorized device to enter into a data capture mode.

The first data can comprise individual sensing data from the one or more authorized devices. The individual sensing data can comprise one or more of: time value, a crypto key, token, MAC, etc, that a particular sensing data was acquired.

The method can further comprise ranking the one or more authorized devices based on a characteristic of the one or more devices; and assigning a weighting factor based on the ranking, where authorized device with a higher rank are assigned a higher weighting factor, wherein the determining that the time sequence of the proximity events matches the expected time sequence of expected of proximity events is based on the weighting factor that is assigned. The characteristic can comprises a number of different sensing modalities, an authentication with a trusted entity.

The determining that the time sequence of the proximity events matches the expected time sequence of expected of proximity events can be based on a predetermined matching threshold of corroborating authorized devices. The determining that the time sequence of the proximity events matches the expected time sequence of expected of proximity events can be based on proximity information received using a near-field communication protocol between the new device and one of the one or more authorized devices.

In some aspects, a device is provided for automatically admitting a device to a network. The device can comprise a memory containing instructions; and at least one processor, operably connected to the memory, the executes the instructions to perform operations comprising: receiving, from the one or more authorized devices in the network, first data that is associated with one or more sensing modalities, wherein the one or more sensing modalities are detected by the one or more of the one or more of the authorized devices during a defined time window; identifying a new device to be admitted to the network; constructing a time sequence of proximity events of the new device, within the defined time window, based on the first data; determining that the time sequence of the proximity events matches an expected time sequence of expected of proximity events; and admitting the new device to the network based on the determining.

In some aspects, a computer readable storage medium is provided comprising instructions for causing one or more processors to perform a method, the method of automatically admitting a device to a network comprising receiving, from the one or more authorized devices in the network, first data that is associated with one or more sensing modalities, wherein the one or more sensing modalities are detected by the one or more of the one or more of the authorized devices during a defined time window; identifying a new device to be admitted to the network; constructing a time sequence of proximity events of the new device, within the defined time window, based on the first data; determining that the time sequence of the proximity events matches an expected time sequence of expected of proximity events; and admitting the new device to the network based on the determining.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

The Internet utilizes communication processes, such as Domain Naming System (DNS) related standards, that can be leveraged in a number of ways to support data communications, device discovery and privacy protection. Aspects of the present disclosure are related to an Internet of Things (IOT) service. According to aspects, the IOT service enables interactions between entities on the Internet and IOT capabilities, many of these incorporating new uses of DNS related processes. The IOT service includes a bundle of services that allow IOT devices to be registered, authenticated, and securely communicate with consuming entities and users. The IOT service utilizes DNS processes and services to register and authenticate the IOT devices. In addition to capabilities based on new techniques of leveraging existing Internet-related processes, new capabilities can be defined that would extend those standards or provide capabilities that are not addressed by standards. The combination of these capabilities meets commonly found requirements for IOT security, privacy, communications, and data processing.

Figure 1:
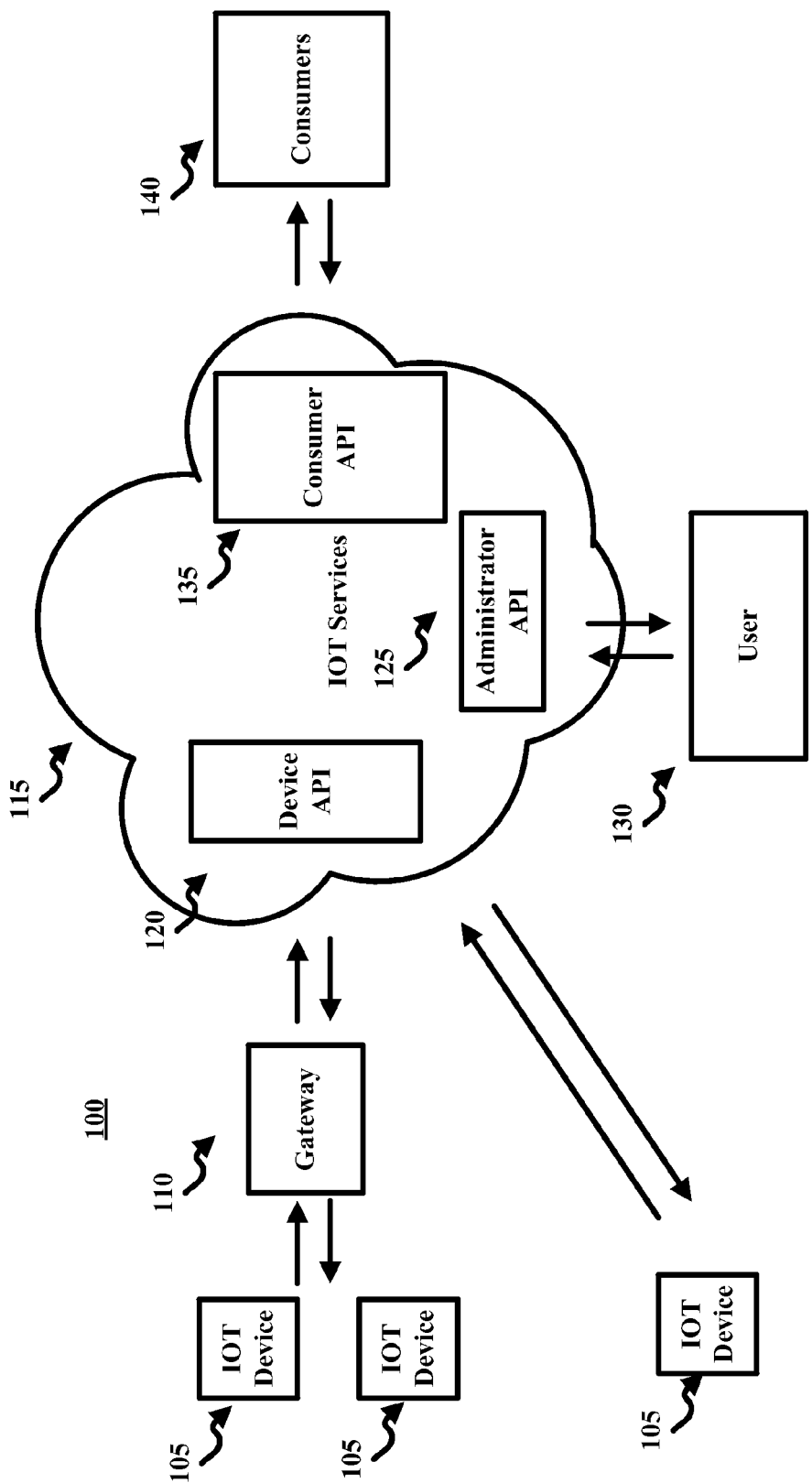
FIG. 1 illustrates an IOT environment including an IOT service, according to various aspects of the present disclosure.

FIG. 1 illustrates an IOT environment 100 including an IOT service 115, according to various aspects of the present disclosure. While FIG. 1 illustrates various components contained in the IOT environment 100, FIG. 1 illustrates one example of an IOT environment and additional components can be added and existing components can be removed.

As illustrated, the IOT environment 100 can include a number of IOT devices 105. The IOT devices 105 can be any type of electronic device that is capable of communicating with other electronic devices. For example, the IOT devices 105 can include a wide variety of devices such as conventional computing device, smart phones, appliances (e.g. washer/dryers that utilize network communications, smart thermostat systems, etc.), sensors (e.g. remote monitoring heart monitoring implants, biochip transponders, automobiles sensors, etc.), and the like.

In aspects, the IOT devices 105 can include the necessary hardware and software to directly communicate with an IOT service 115. In this example, the IOT devices can include the necessary hardware and software to communicate with the IOT service 115 using various protocols supported by the IOT service such as publish-subscribe messaging protocols, i.e., Message Queue Telemetry Transport ("MQTT"), and Domain Name System ("DNS") processes and services. Likewise, the IOT devices can be connected to an intermediary, such as a gateway 110. In this example, the gateway 110 can include the necessary hardware and software to communicate with the IOT devices 105 and the necessary hardware and software to communicate with the IOT service utilizing various protocols supported by the IOT service such as MQTT and DNS processes and services.

The Domain Name System ("DNS") is the part of the Internet infrastructure that translates human-readable domain names into a source and data identifier, such as, Internet Protocol ("IP") numbers needed to establish TCP/IP communication over the Internet. DNS allows users to refer to web sites, other resources, and allows discovery using easier to remember domain names, such as "www.example.com", rather than the numeric IP addresses associated with a website, e.g., 192.0.2.78, and assigned to computers on the Internet. Each domain name can be made up of a series of character strings (e.g., labels) separated by dots. The order of the labels represents a relationship between domain names within the DNS hierarchy. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "www.example.com". Domains can nest within the hierarchy for many levels. For example, each second-level domain can include a number of third-level domains located immediately to the left of the second-level domain, e.g. the "www" level in www.example.com. The labels in a domain name include one or more characters, each of which may either be an ASCII character or a language-specific character (e.g., Arabic, Chinese, Hindi, and Latin letters with diacritics (e.g., é)). Domain names represented, in whole or in part, by language-specific characters are called Internationalized Domain Names (IDNs). While not yet available, potential IDN versions of well-known TLDs, such as ".com," ".net," and ".org." could also be created.

The responsibility for operating each TLD, including maintaining a registry of the second-level domains within the TLD, is delegated using a hierarchy of DNS services with different entities acting as the "registry" or "authoritative" registry for a portion of the hierarchy to a particular organization, known as a domain name registry ("registry"). The registry is primarily responsible for answering queries for data like IP addresses associated with domains ("resolving"), typically through DNS servers that maintain such information in large databases, and for operating its top-level domain.

For most TLDs, in order for end-users to obtain a domain name, that domain name has to be registered with a registry through a domain name registrar, an entity authorized to register Internet domain names on behalf of end-users. Alternatively, an end-user can register a domain name indirectly through one or more layers of resellers. A registry may receive registrations from hundreds of registrars.

A zone file is a text file that describes a portion of the DNS called a DNS zone. A zone file is organized in the form of resource records (RR) and contains information that defines mappings between domain names and IP addresses and other resources. The format of zone files is defined by a standard, with each line typically defining a single resource record. A line begins with a domain name, but if left blank, defaults to the previously defined domain name. Following the domain name is the time to live (TTL), the class (which is almost always "IN" for "internet" and rarely included), the type of resource record (A, MX, SOA, etc.), followed by type-specific data, such as the IPv4 address for A records. Comments can be included by using a semi-colon and lines can be continued by using parentheses. There are also file directives that are marked with a keyword starting with a dollar sign.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism generally helps avoid the need for a single central registry to be continually consulted and updated. The DNS resolution process allows for users to be directed to a desired domain by a lookup process whereby the user enters the desired domain, and the DNS returns appropriate IP numbers. During the DNS resolution process, a request for a given domain name is routed from a resolver (e.g., a stub resolver) to an appropriate server (e.g., a recursive resolver) to retrieve the IP address. To improve efficiency, reduce DNS traffic across the Internet, and increase performance in end-user applications, the DNS supports DNS cache servers that store DNS query results for a period of time determined by the time-to-live (TTL) of the domain name record in question. Typically, such caching DNS servers, also called DNS caches, also implement the recursive algorithm necessary to resolve a given name starting with the DNS root through to the authoritative name servers of the queried domain. Internet service providers (ISPs) typically provide recursive and caching DNS servers for their customers. In addition, home networking routers may implement DNS caches and proxies to improve efficiency in the local network.

According to aspects of the present disclosure, the IOT service 115 can assign a domain name to each of the IOT devices 105. The domain name can then be associated with the IP address of the IOT device 105. Domain names, i.e., qnames, can also be assigned by an entity owner of the IoT device 105. To facilitate the registration of IOT devices, an IOT service can provide an application programming interface (API) that performs DNS registration of IOT devices on behalf of devices and gateways (DNS API not shown). The IOT service 115 can provide a domain name that uniquely identifies the devices as IOT devices and also shows the relationship of the devices. For example, the IOT service 115 can establish a domain for IOT devices such as ".iotservice.example.com." As the devices are registered with the IOT service 115, the IOT service assigns the domain name and creates the DNS records for the IOT devices. For example, if the IOT devices 105 are owned by "Company A," the IOT service can create a domain "companyA.iotservice.example.com." The IOT service 115 can assign a unique domain name to each of the IOT devices, for example, "iotdevice1.companyA.iotservice.example.com." The domain and the domain names for each of the IOT devices allow consumers 140 to locate and communicate with the IOT devices 105.

The IOT service 115 can also include an API 125 to allow a user 130 to communicate with the IOT service 115. The user 130 can communicate with the IOT service to establish the services of the IOT service 115, register devices 105, and the like. The IOT service 115 can also include an API 135 to allow the consumers 140 to locate and communicate with the IOT devices 105. In some aspects, one or more services provided by the IOT service 115 can reside in the cloud.

Figure 2A:
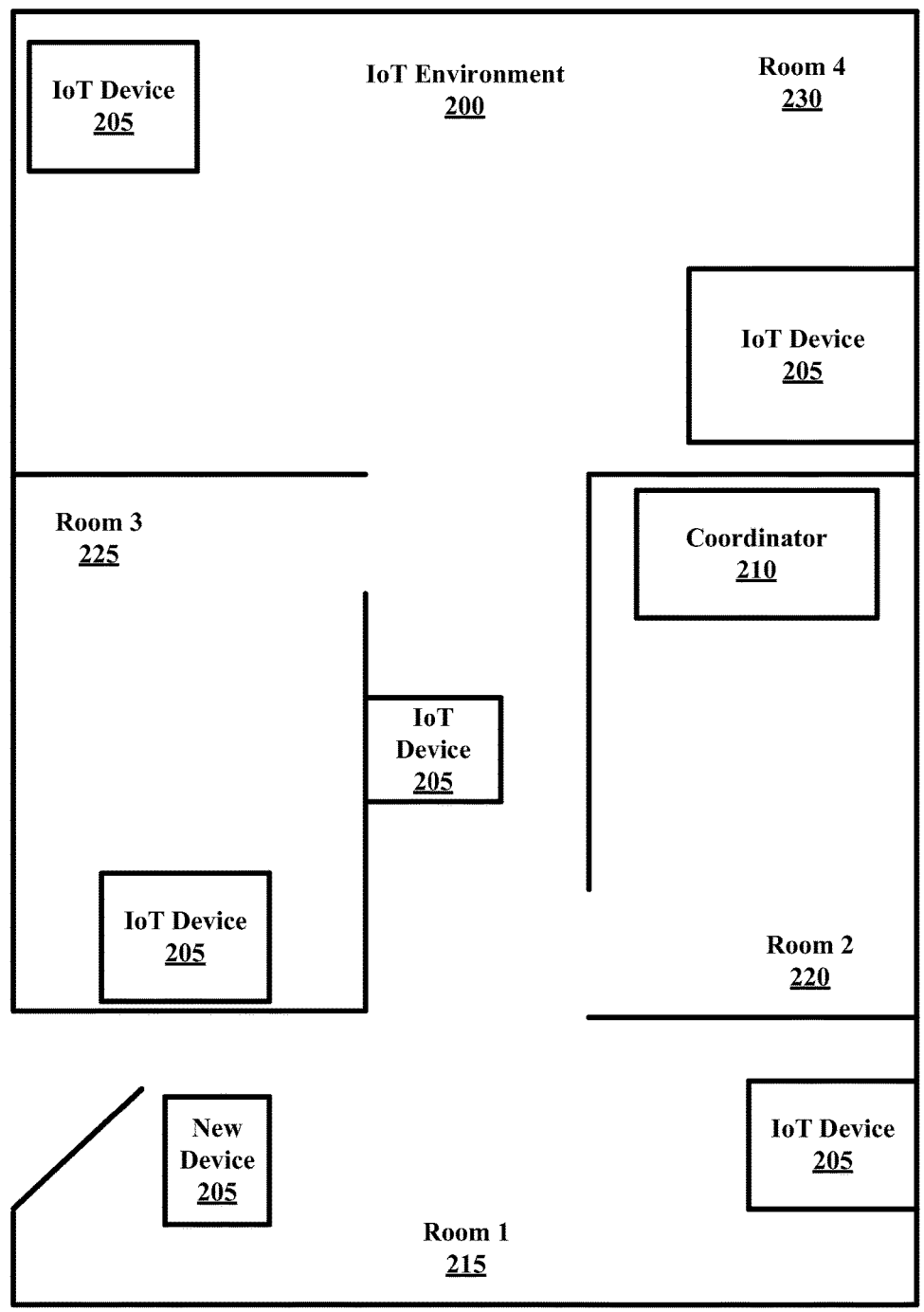
FIG. 2A shows an example IoT environment for auto-detection of a new IoT device, according to aspects consistent with the present disclosure.

FIG. 2A shows an example IoT environment for auto-detection of a new IoT device, according to aspects consistent with the present disclosure. As shown in FIG. 2A, IoT environment 200 includes an area, such as a portion of a floor within a building, having a plurality of rooms or spaces. The IoT environment 200 can be within a commercial, residential, educational, etc., environment. Depending on the type of environment and the level of security desired therein, the authorization process can vary from a low level that allows easy access of new devices to the IoT environment 200 to a high level that allows the most robust authentication and security measures to be deployed to anywhere in between.

Within the IoT environment 200, each room or space can include a number of IoT devices. The types of IoT devices that can be within the IoT environment 200 can also vary widely from those that simply measure and report data to those that can be actuated remotely to perform one or more actions. In the example of FIG. 2A, the IoT environment 200 will be described within a home context and the IoT devices will be those that would typically be found in this context. In this example, the IoT devices can be devices that can detect, measure, and/or sense a condition in one or more sensing modalities. These IoT devices include, but are not limited to, particulate concentration measuring devices, i.e., smoke, carbon monoxide, radon, etc. alarms, video cameras, audio listening devices, heat sensing devices, i.e., temperature-based and infrared. In some instances, the IoT devices with the IoT environment 200 may be organized in a hierarchical manner, where certain IoT devices may have a higher status or higher permission level within the IoT environment 200. Various factors can be used to determine whether a particular IoT device is granted with this higher level of authority, such as the number of sensing modalities, where those IoT devices with a greater number of sensing modalities can be granted a higher level of authority with the IoT environment 200.

Typically, each room may have one IoT device; however, there is no requirement that every room include an IoT device. One or more of the rooms may not have any IoT devices, while other rooms may have more than one IoT device. In this example, Room 1 215 includes IoT device 205, Room 2 220 includes a coordinator 210, discussed further below, Room 3 225 includes IoT device 205, Room 4 230 includes IoT devices 205 and 205. Although not explicitly labeled as such, IoT device 205 can be arranged in an adjoining space, i.e., in a hallway, between Room 2 220 and Room 3 225.

The plurality of IoT devices 205 within the IoT environment 200 can be arranged to form a network. The network of existing, e.g., authorized IoT devices 205 can be managed by the coordinator 210, whose functionality can be dispersed among one or more of the IoT devices 205 or can be a separate IoT device. In some cases, the coordinator or IoT devices serving as a coordinator can be granted the highest level of authority within the network.

When a user wants to add a new device 205 to the network of existing IoT devices 205, the new device 205 can be added through an authorization process described herein. The new device 205 can be an IoT device having one or more sensors capable of sensing in one or more sensing modalities and a transponder to transmit data related to the one or more sensing modalities and/or receive data from other IoT devices or coordinator. Alternatively, the new device 205 can be a device that is only capable of detecting one or more sensing modalities. In the processes described below, the new device 205 can be either type of device. If the new device 205 is of the first type, the new device 205 can detect, measure, record, and transmit data for each event, as discussed below, as measured by the one or more sensors. The data recorded by the new IoT device 205 can be compared with data recorded at each event by the authorized IoT devices 205.

Figure 2B:
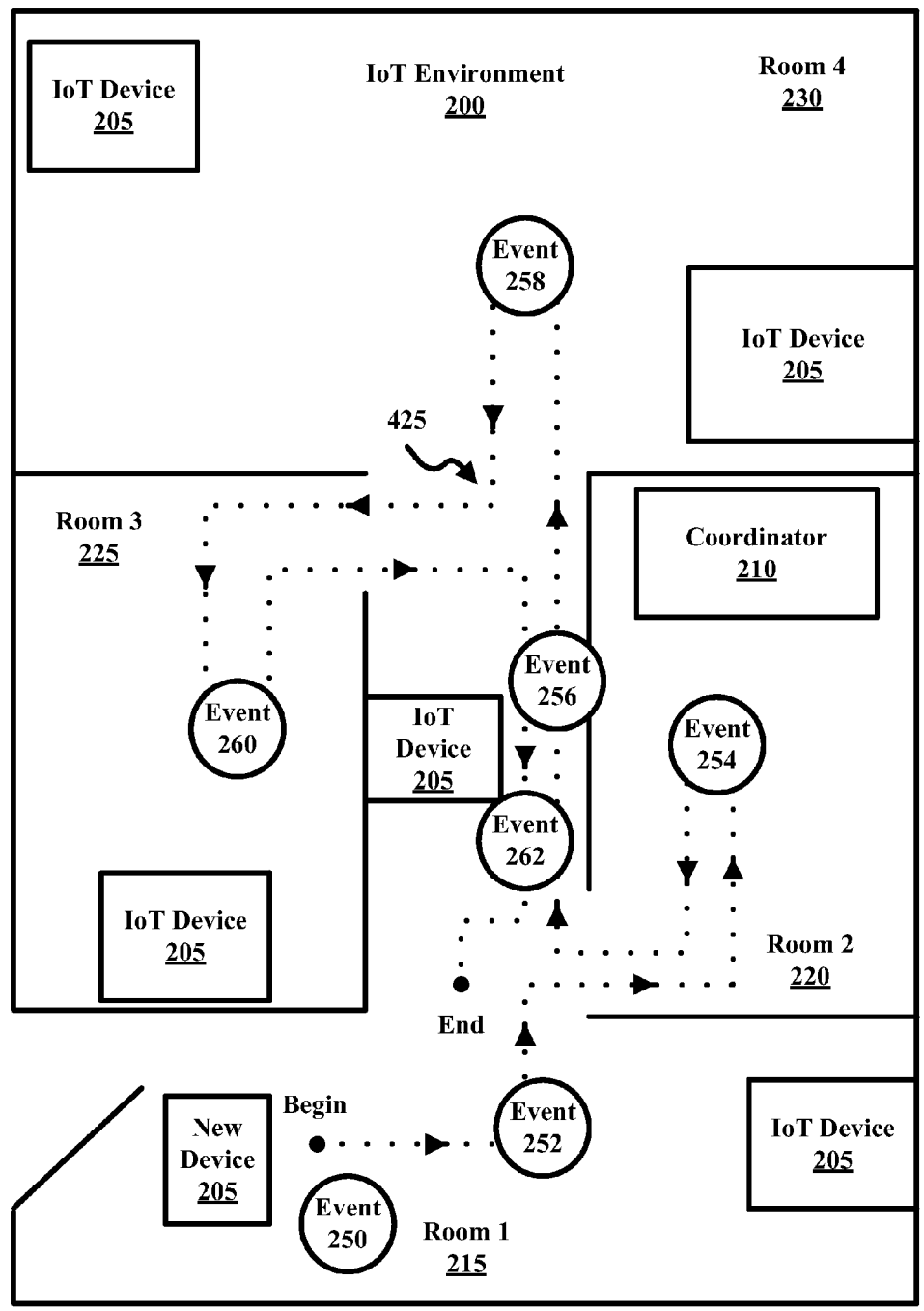
FIG. 2B shows an example auto-detection of a new IoT device 205 within an IoT environment 200, according to aspects consistent with the present disclosure.

FIG. 2B shows an example auto-detection of a new IoT device 205 within an IoT environment 200, according to aspects consistent with the present disclosure. For example, as illustrated in FIG. 2B, the user introduces the new device 205 to one or more of the authorized IoT devices 205 within the IoT environment 200. The introduction of the new device 205 can be by way of traversing a path 425 where the new device 205 is brought into physical proximity of a sensing modality of the one or more of the authorized IoT devices 205. An event occurs each time the new device 205 is within the physical proximity of the sensing modality of an IoT device 205.

As shown in FIG. 2B, the new device 205 enters the IoT environment 200 and an event 250 and an event 252 is created in Room 1 215 in association with IoT device 205. The new device 205 progresses into Room 2 220 where an event 254 is created in association with coordinator 210. As the new IoT device 205 exits Room 2 220 and moves within physical proximity of a sensing modality of IoT 205 in the hallway, an event 256 is created. Event 258 is created as the new IoT device enters Room 4 230 containing IoT devices 205 and 205. Event 260 is created as the new IoT device enters Room 3 225 containing IoT device 205 and the path 425 concludes as event 262 is created in the hallway near the IoT device 205.

Figure 3:
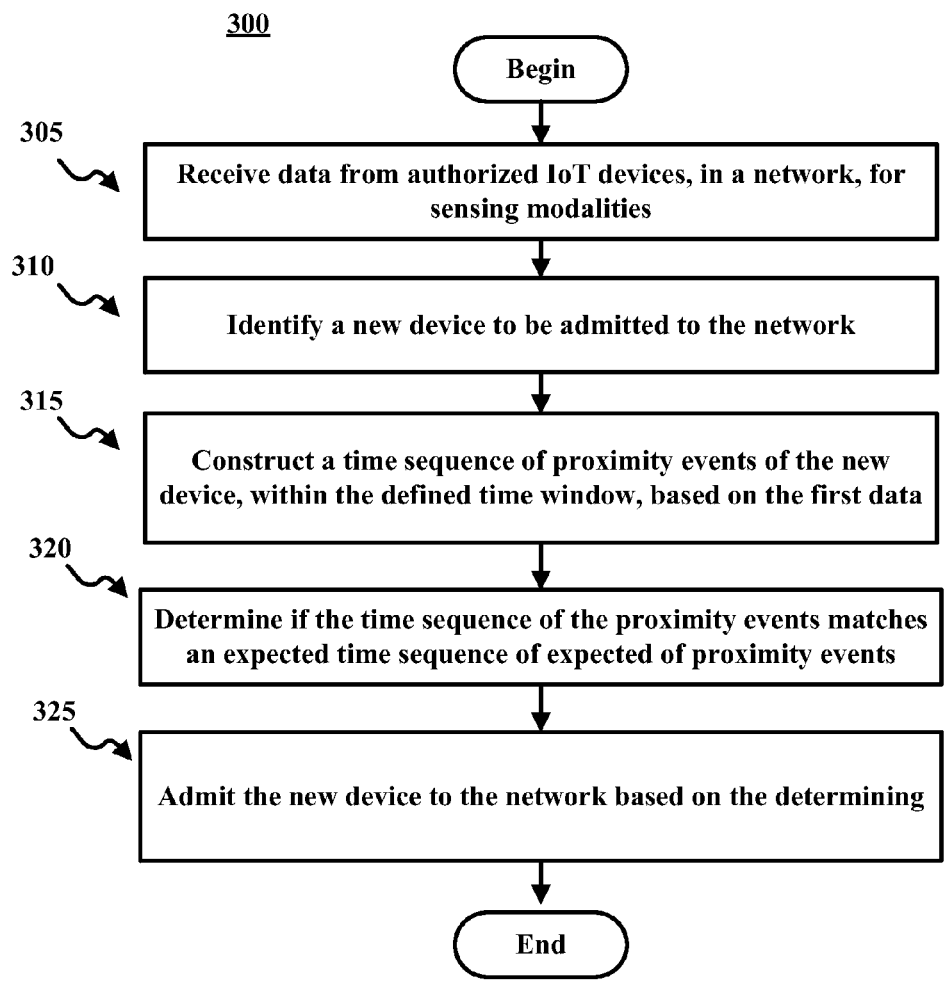
FIG. 3 shows an example auto-detection of a new IoT device 205 within an IoT environment 200, according to aspects consistent with the present disclosure.

FIG. 3 shows an example auto-detection of a new IoT device 205 within an IoT environment 200, according to aspects consistent with the present disclosure. Once the process begins, in 305 the coordinator 210 receives data from the network of authorized IoT devices for their respective sensing modalities. In 310, the coordinator 210 identifies a new device to be admitted to the network. In this example, the user may activate a network discovery mode of the new device 205 by pushing a discovery mode button, a reset button, or a similar type activation button. Alternatively, the new device 205 may enter into the network discovery mode once the device is turned on or when batteries are installed in the new device 205. The network discovery mode may be a broadcast signal that can be received by one or more of the authorized IoT devices 205 and/or the coordinator 210. If one of the one or more authorized IoT devices 205 receives the broadcast signal, the IoT device 105 that received the signal can forward the signal on to the coordinator 210. If the coordinator 210 receives the broadcast signal either from the new IoT device 205 or from one of the one or more authorized IoT devices 205, the coordinator 210 can send a control signal to the authorized IoT devices 205 instructing them to enter into an authorization mode, where each of the authorized IoT devices can individually, or in combination with other authorized IoT devices 205, be used to authenticate the new IoT device 205.

In 315, the coordinator 210 constructs a time sequence of proximity events for the new device within a defined time window based on the first data. In this example, the coordinator 210 can receive events from each of the authorized IoT devices 205 and order the events into a time sequence. As one example, after each IoT device 205 records a particular event, that IoT device 205 can provide that event information to the coordinator 210. The coordinator 210 can then record a time at which each event is received and use that time to construct the time sequence. Alternatively, the coordinator 210 can use the time recorded by each IoT device 205 when each event occurs. In some instances, if a particular IoT device 205 cannot record or determine a time at which an event occurs, the coordinator 210, in conjunction with other IoT devices 205, can infer a time for a particular event based corroborating and/or complementary information for other IoT devices 205. For instance, if IoT device 205 in Room 3 225 cannot record at time for event 260, the coordinator 210 can use data from events 258 and 262 to infer when event 260 occurs in the time sequence.

In 320, the coordinator 210 determines if the time sequence of the proximity events matches an expected time sequence of expected proximity events. Once the coordinator 210 constructs the time sequence of events, the coordinator determines if the time sequence is what would be expected if the new device 205 traveled along a path through the IoT environment 200.

In 325, the coordinator 210 admits the new device to the network based on the determination that the time sequence of the proximity events matches an expected time sequence of expected proximity events. In some instances, the coordinator 210 may delegate the responsibility of determining admission of the new device to one or more of the other IoT devices 205. The coordinator 210 may poll the authorized IoT devices 205 or the one or more IoT devices 205 may vote to determine if the new device is to be admitted. In this instance, a predetermined threshold of authorized IoT devices 205 can be used to permit the new device to join the network. The predetermined threshold can be set to be more than 50%, 66%, 75%, etc of authorized IoT devices 205.

FIGS. 4A-4H shows an example auto-detection of a new IoT device 402 within an IoT environment 400, according to aspects consistent with the present disclosure. In the IoT environment 400, a user wishes to add a new thermostat 402 that can measure temperature and can communicate with other devices using near-field communication protocols to the existing authorized network of devices. The IoT environment 400 includes the following: Room 1 404 containing a camera 414 that can record video and still images; Room 2 406 containing a WiFi router 412 that can communicate with other devices using both WiFi and near-field communication protocols; Room 3 408 containing a satellite radio 422 that can communicate using WiFi communication protocols; Room 4 410 containing a IR detector 418 that can use IR to detect movement and a refrigerator 420 that can maintain one or more temperatures ranges within and can communicate using WiFi communication protocols; and a hallway (not labeled) between Room 2 406 and Room 3 408 containing a smoke alarm 416 that can measure temperature and smoke particulates in standard units, i.e., parts per million.

Figure 4A:
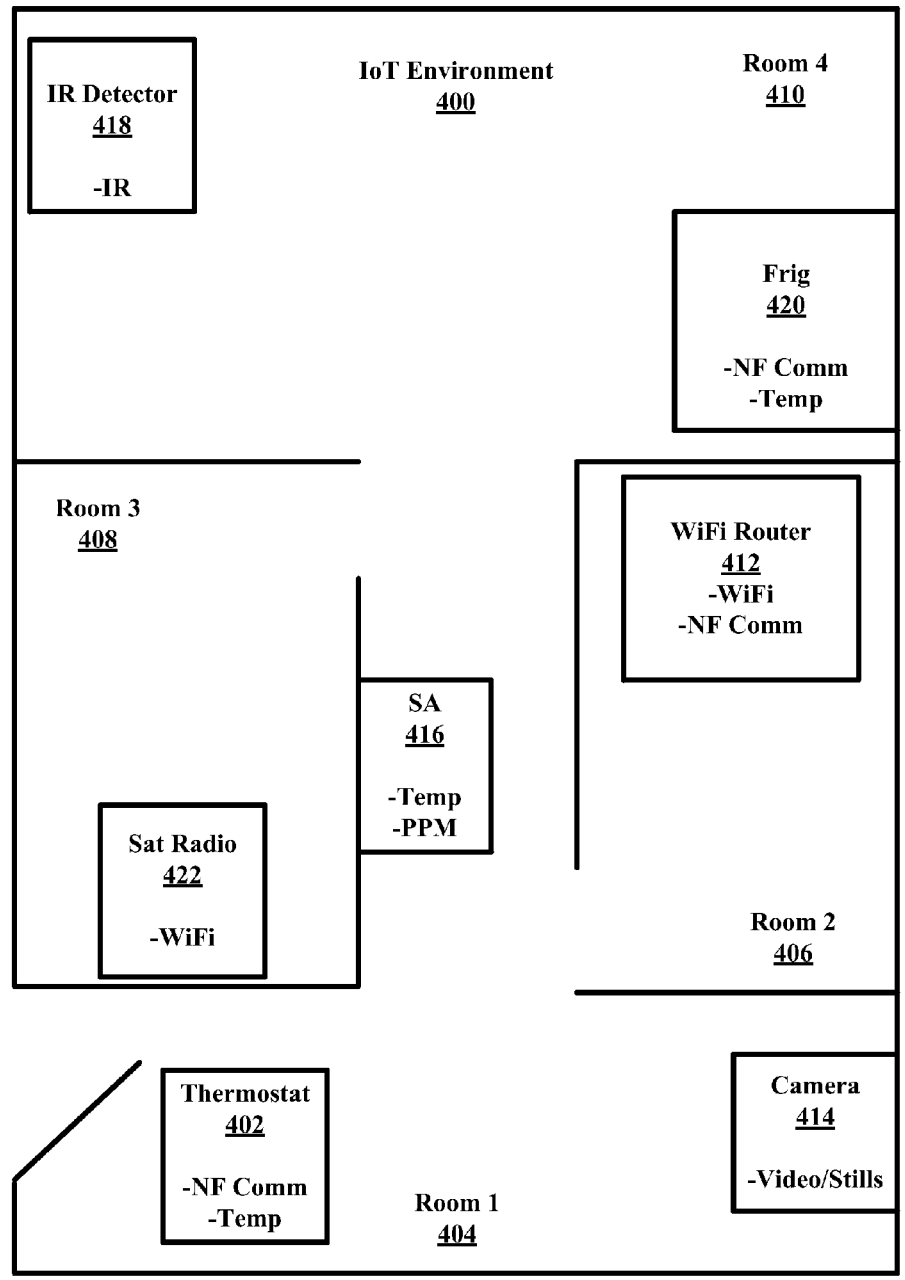
FIGS. 4A-4H shows an example auto-detection of a new IoT device 402 within an IoT environment 400, according to aspects consistent with the present disclosure.
Figure 4B:
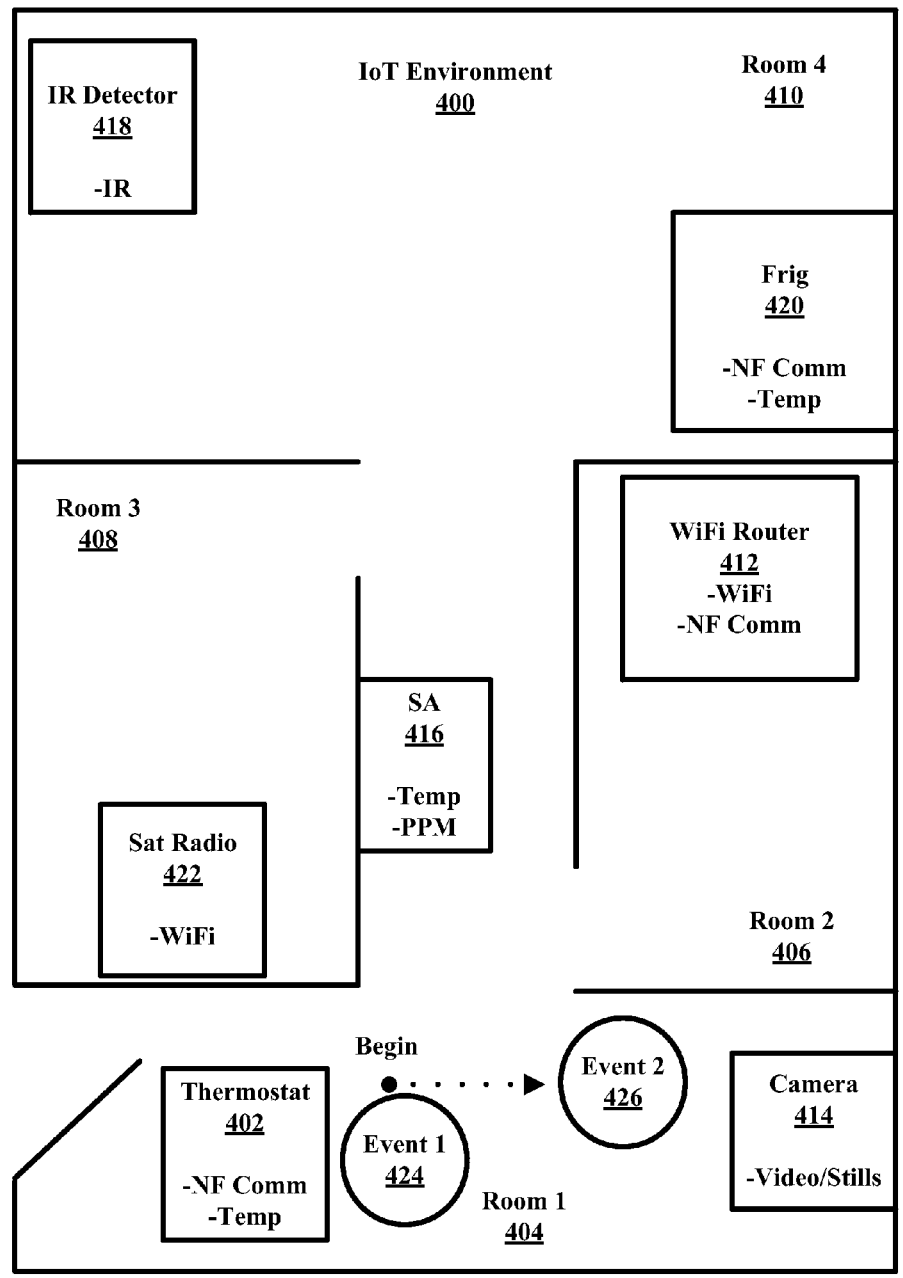

As discussed above with reference to FIGS. 2B and 3, a coordinator 210, WiFi router 412 in the example of FIGS. 4A-4H, can instruct each of the authorized IoT devices to enter into an authentication mode that can be used to authenticate new devices to the network. Alternatively, each authorized IoT device may enter into this mode after receiving a discovery signal from a new device. As shown in FIG. 4B, the user brings the thermostat 402 that the user would like to add to the network of authorized IoT devices into Room 1 404. The camera 414 that is monitoring Room 1 404 records event 1 424 at time $t_{c1}$ and event 2 426 at time $t_{c2}$ as separate events with corresponding successive time stamps. Additionally, the thermostat 402 can record a temperature measurement in Room 1 404 at time $t_{t1}$, which can be correlated or matched with event 1 424 at time $t_{c1}$ and/or event 2 426 at time $t_{c2}$. The measurement made by the thermostat 402 at time $t_{t1}$ and the events 1 424 at time $t_{c1}$ and 2 246 at time $t_{c2}$ made by the camera 414 can be used show that the thermostat 402 was in Room 1 404 at time $t_{t1}$ at the time the measurements were made.

Figure 4C:
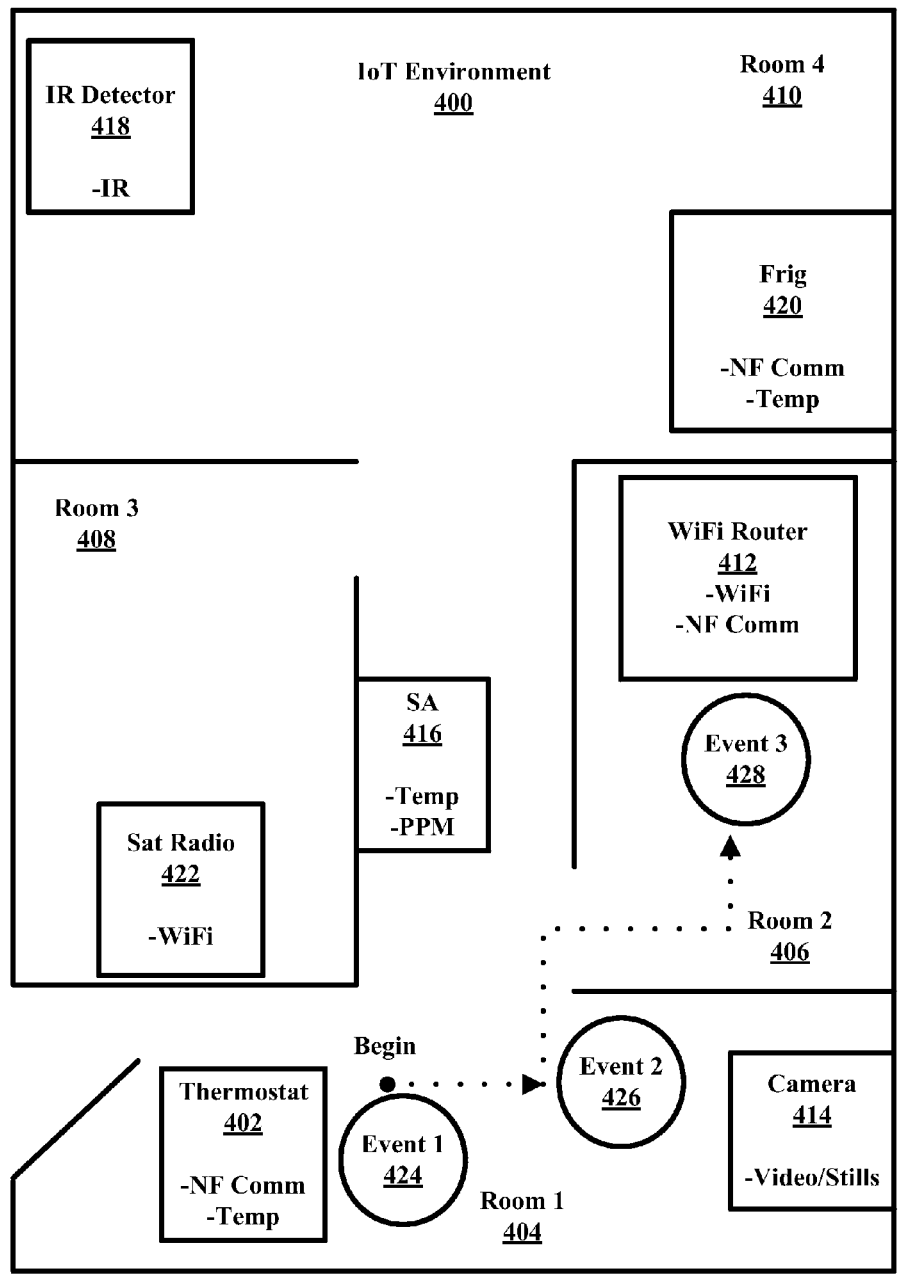

As shown in FIG. 4C, the thermostat 402 is brought into Room 2 406 where event 3 428 is recorded by WiFi router 412 at time $t_{wifi3}$. For example, since both the thermostat 402 and the WiFi router 412 can each communicate using a near-field communication protocol, the event 3 428 can include information regarding a time duration that the thermostat 402 is within the proximity range of the WiFi router 412 for the near-field communication protocol to be effective. Again, the thermostat 402 can record another measurement in Room 2 406 at time $t_{t2}$.

Figure 4D:
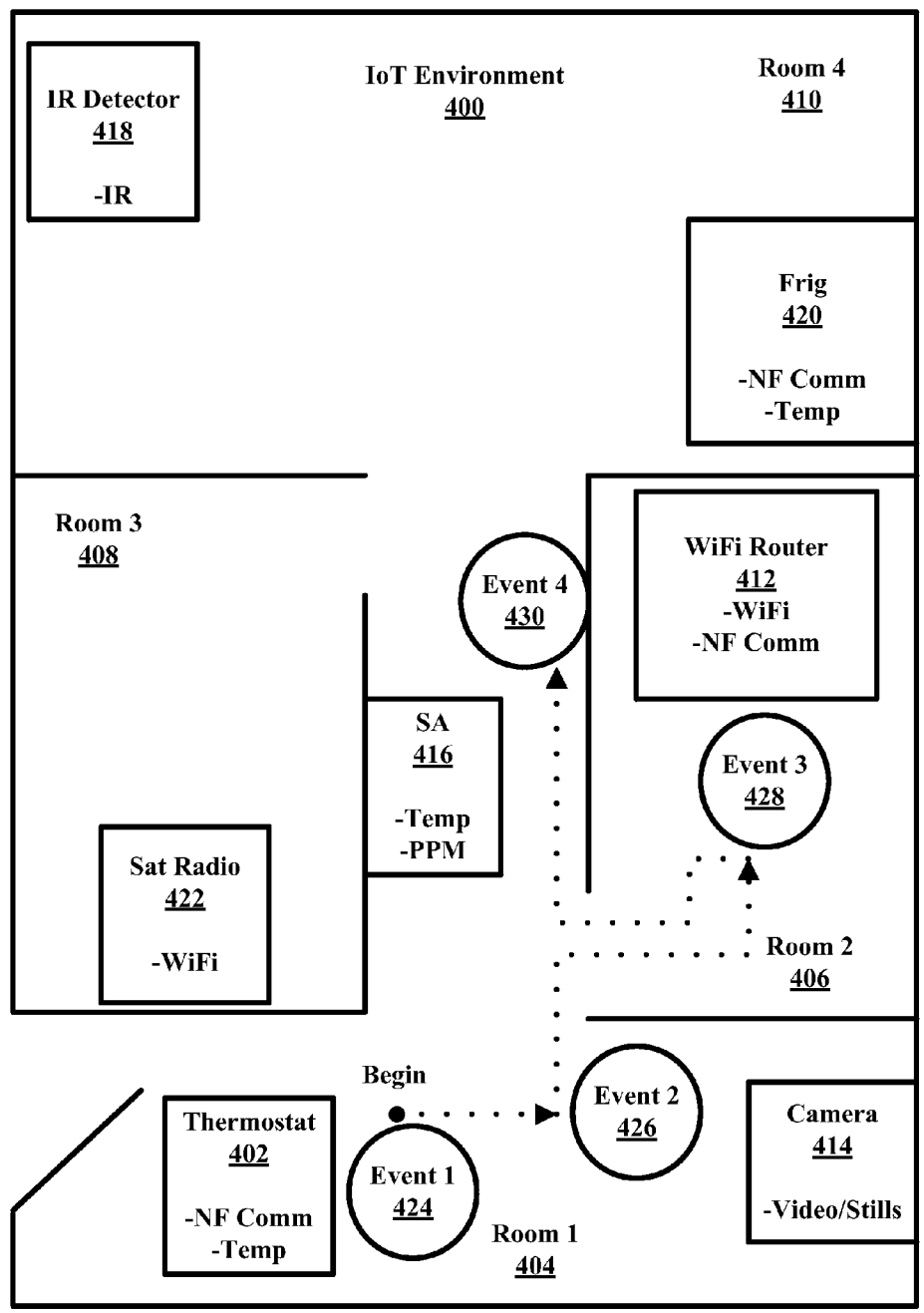

As shown in FIG. 4D, the thermostat 402 leaves Room 2 406 and is brought along the hallway that contains the smoke alarm 416 where event 4 430 is created at time $t_{sa4}$. Again, the thermostat 402 can record another measurement in the hallway at time $t_{t3}$. For example, as thermostat 402 is brought in proximity of the smoke alarm 416, both the thermostat 402 and the smoke alarm 416 can take independent temperature measurements, which can later be compared by the coordinator to show that the thermostat 402 was at the location when event 4 occurred.

Figure 4E:
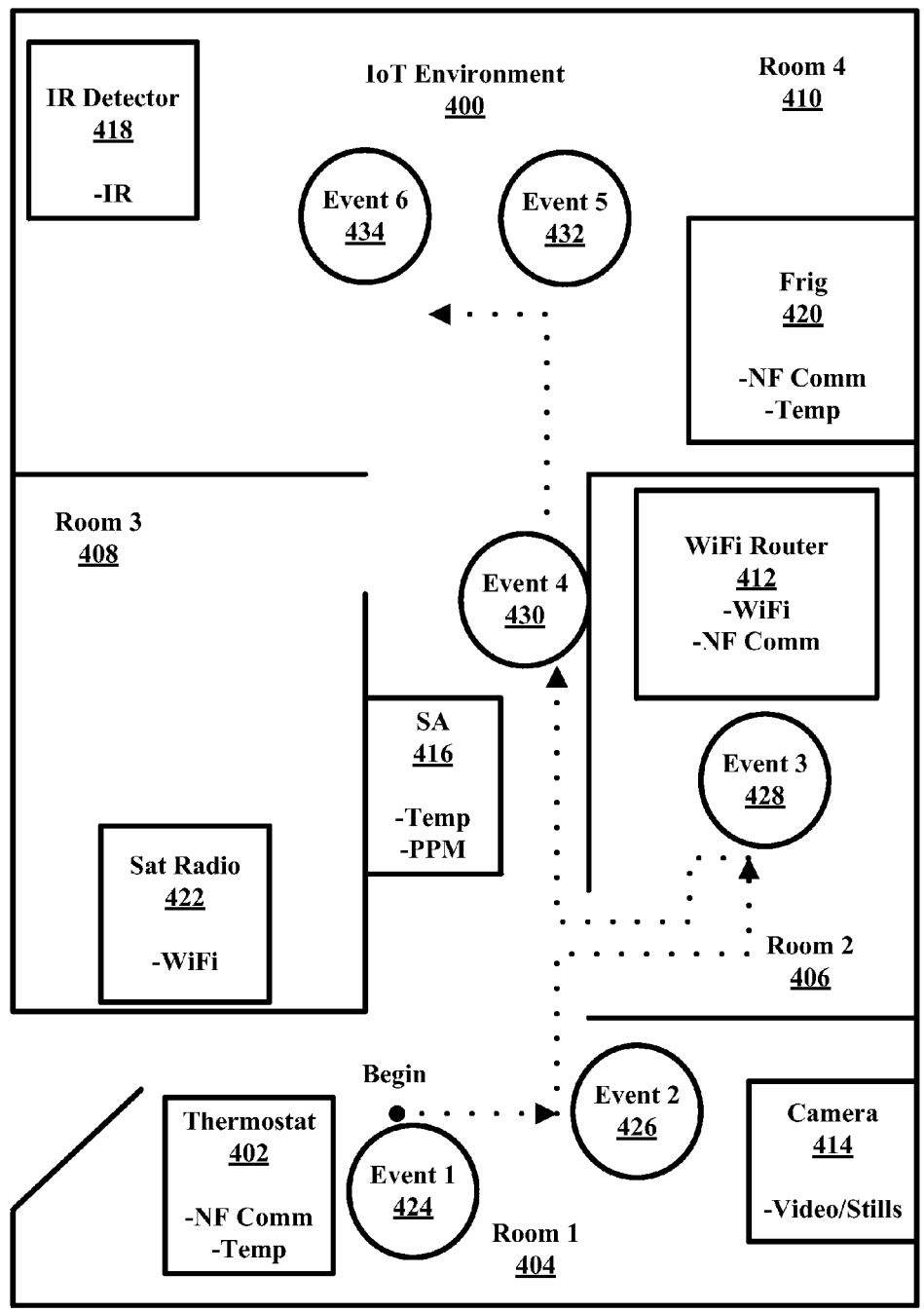

As shown in FIG. 4E, the thermostat 402 is brought into Room 4 410, which includes the refrigerator 420 and the IR detector 418, where event 5 432 at time $t_{IR5}$ and event 6 434 at time $t_{frig6}$, are successively created. Again, the thermostat 402 can record another measurement in Room 4 410 at time $t_{t4}$. For example, since both the thermostat 402 and the refrigerator 420 can each measure temperature and communicate using a near-field communication protocol, the event 5 432 can include information regarding a temperature and a time duration that the thermostat 402 is within the proximity range of the refrigerator 420 for the near-field communication protocol to be effective. Further, as the thermostat 402 comes within the infrared range of IR detector 418, event 6 434 can include a corresponding timer interval as detected by the IR detector 418.

Figure 4F:
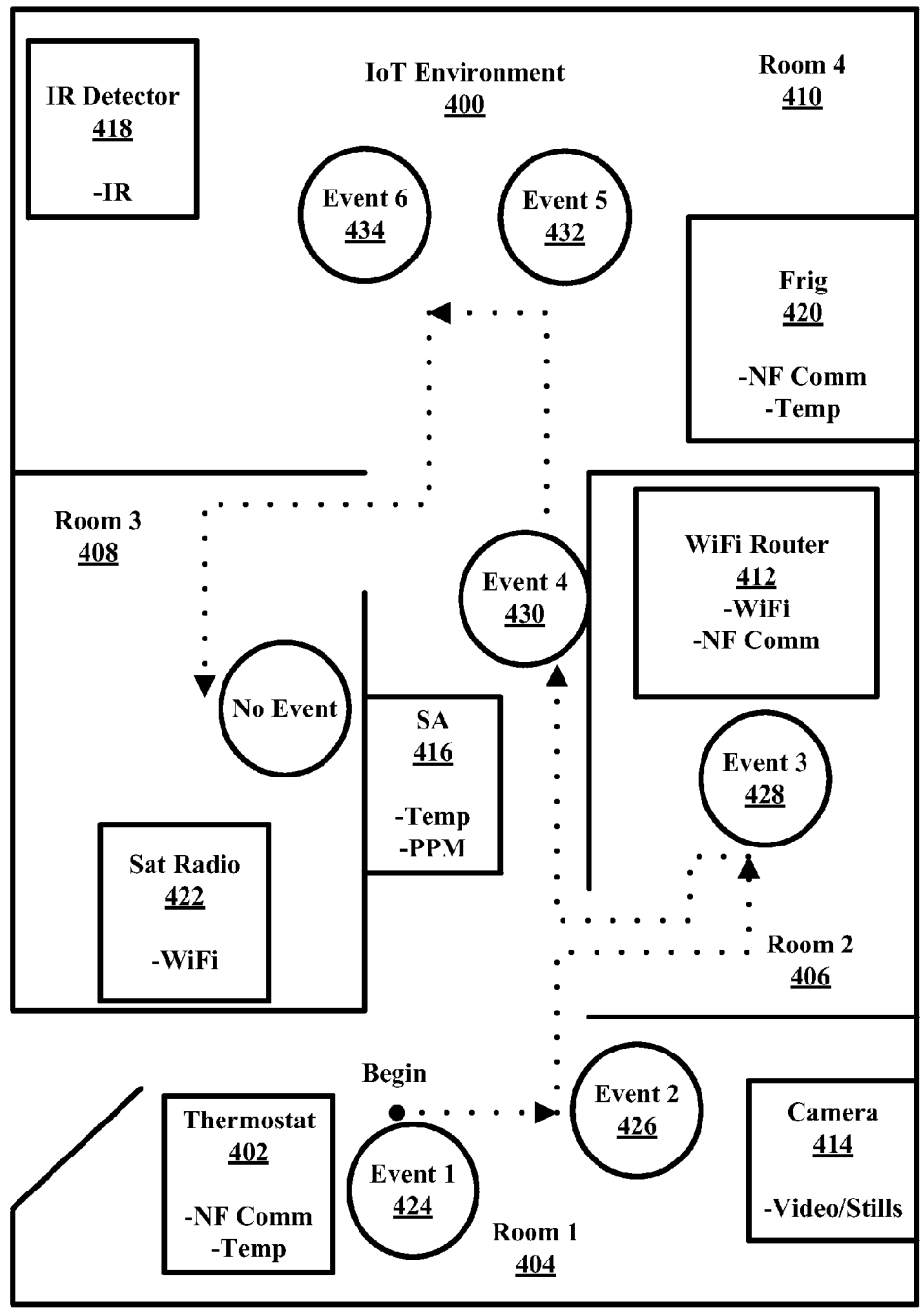
Figure 4G:
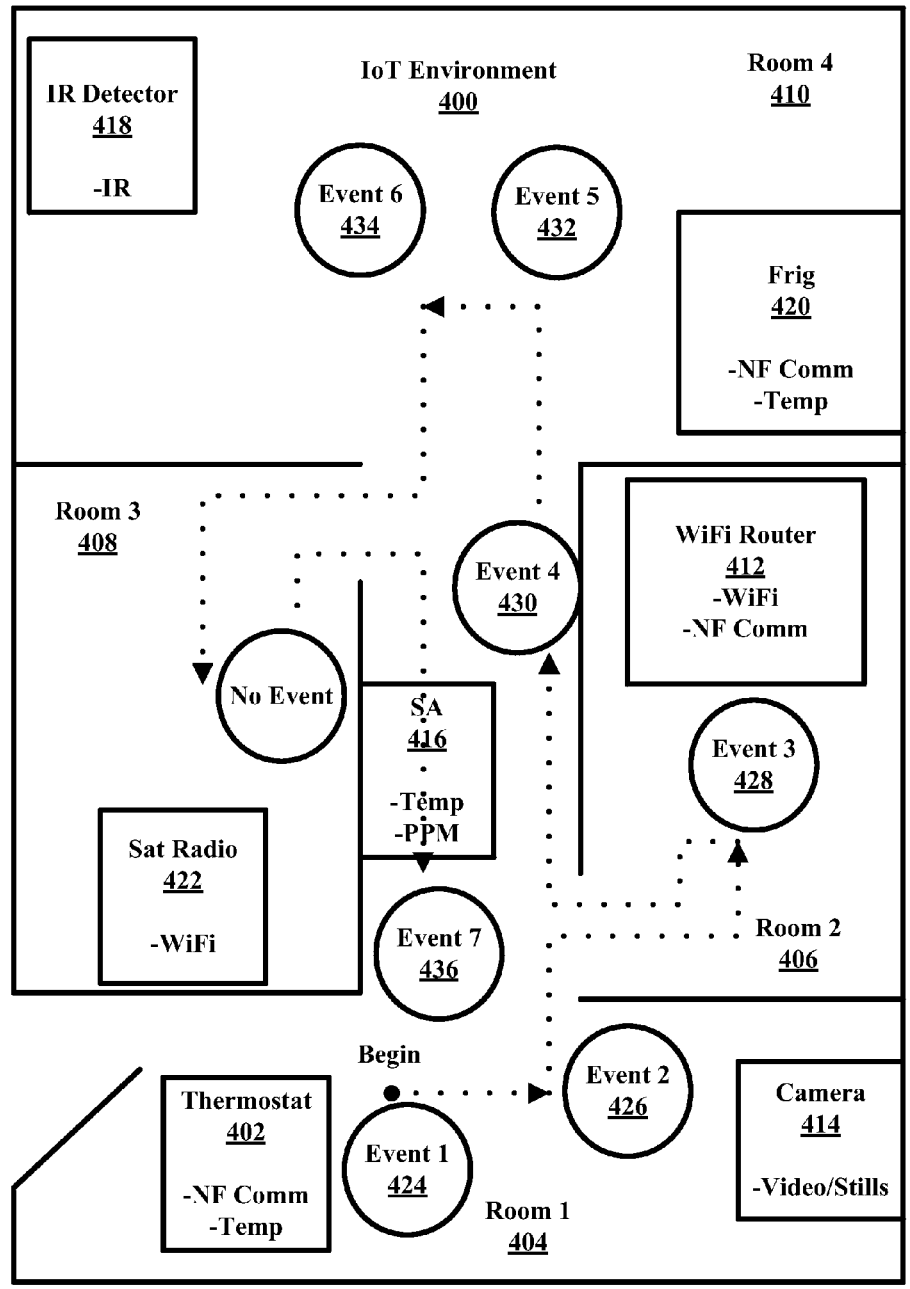
Figure 4H:
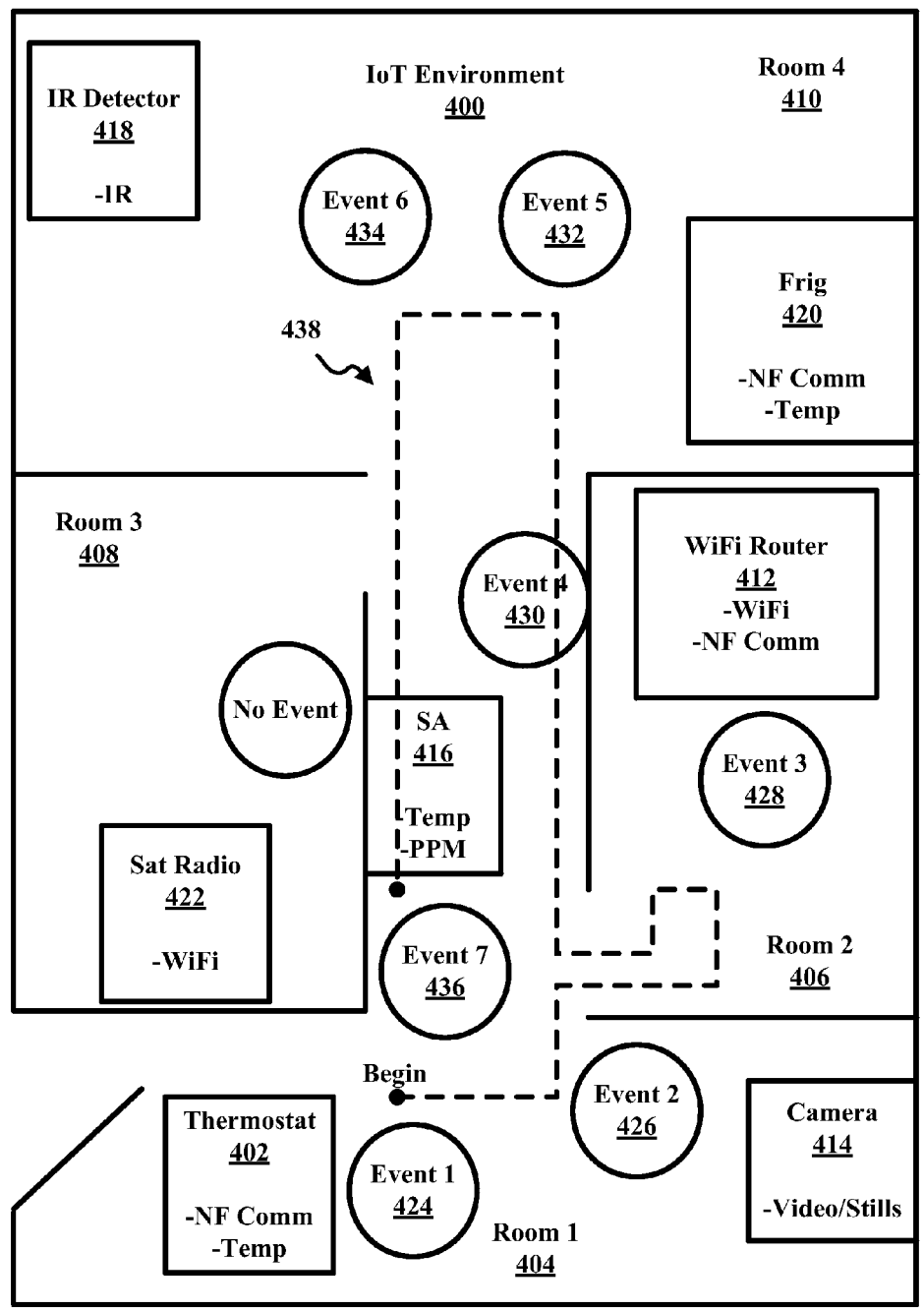

As shown in FIG. 4F, the thermostat 402 is brought into Room 3 408, which includes the satellite radio 422, and since the satellite radio does not include any sensing modalities, no event is created. Again, the thermostat 402 can record another measurement in Room 3 408 at time $t_{t5}$. As shown in FIG. 4G, the thermostat 402 leaves Room 3 408 and is brought along the hallway containing the smoke alarm 416 where event 7 436 at time $t_{sa7}$ is created. Again, the thermostat 402 can record another measurement in the hallway at time $t_{t6}$. The path 438 that the thermostat 402 traversed is shown in FIG. 4H.

The authorization process described above can be used to reduce, if not eliminate, potentially harmful devices from spoofing the IoT environment 200 or 400 to gain entry to the network of authorized IoT devices 205. For instance, consider the case where a user of the thermostat 402 is intentionally trying to deceive IoT environment 400 by sending temperature measurements that the thermostat 402 determines are similar to those in the IoT environment 400. By comparing the events 424, 426, 428, 430, 432, 434, 436 and the respective times at which those events occurred as determined or recorded by the authorized IoT devices 205 with the temperature measurements sent by the thermostat 402, the coordinator 210 or the coordinator functionality can determine the accuracy of the temperature measurements and use this data to determine if the thermostat 402 should be allowed to enter the network. If one or more of the temperature measurements and a time value corresponding to those measurements sent by the thermostat 402 does not match what is expected from the authorized IoT devices 205, the thermostat 402 can be denied entry into the network.

In order to provide additional security, the coordinator 210 or the coordinator functionality embodied in one or more authorized IoT devices 205 in the network within the IoT environment 200 or 400 can remove the new device 205 as an authorized device based on one or more factors. For example, if the new device is not within proximity of the IoT environment 200 or 400 for a predefined period of time, the new device 205 can be removed from a list of permissible devices. The predefined period of time can be selected based on a desired level of security of the IoT environment 200 or 400 and can be selected to be a time period based on a number of hours, days, weeks, or months, etc. If the new device 205 loses its authorization, the process described above may be employed to admit the new device 205 to the IoT environment 200 or 400 again.

Figure 5A:
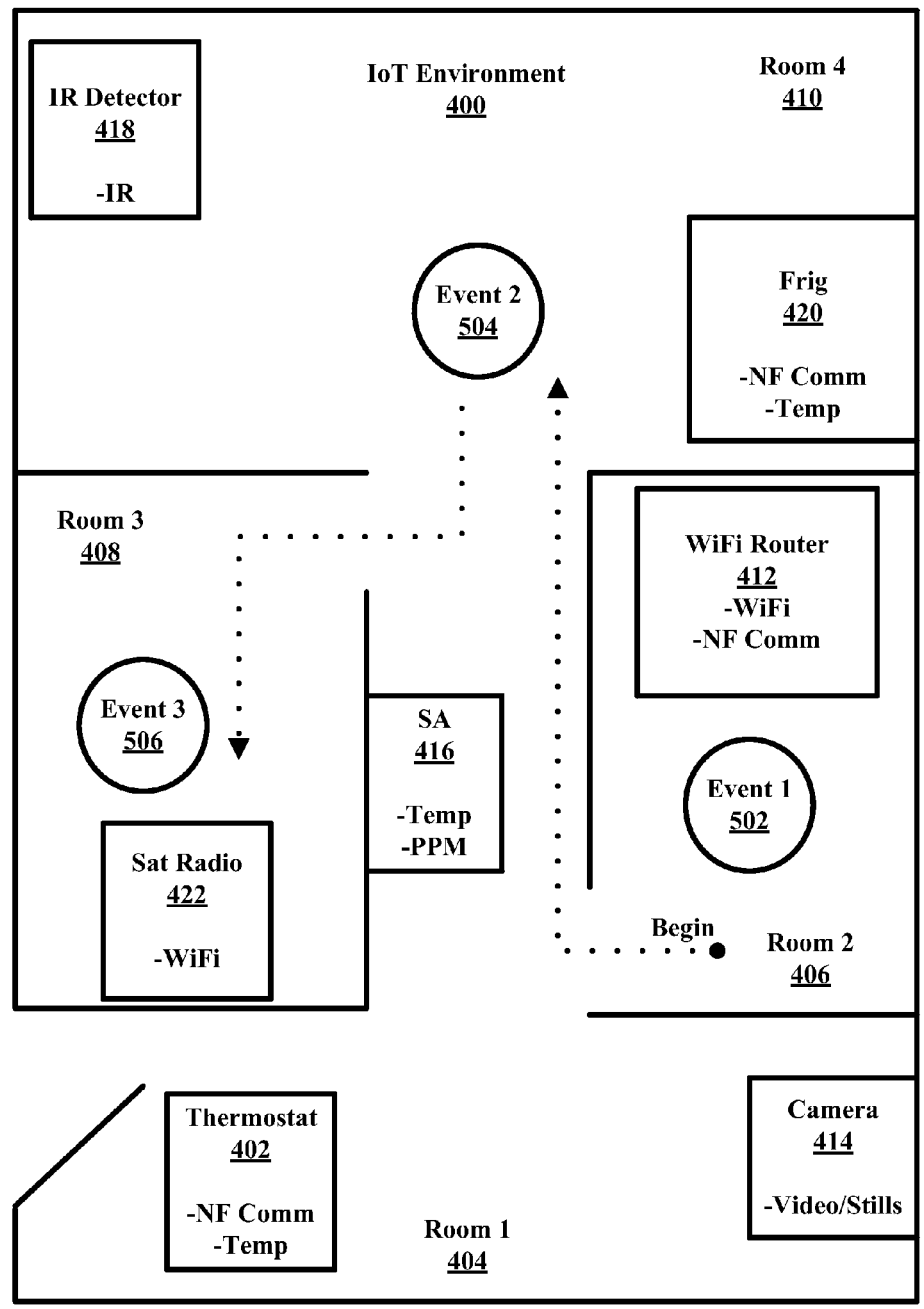
FIGS. 5A and 5B is a similar arrangement to FIG. 4A-4H and shows an example process by which a malicious user attempts to falsify reading by a new IoT device, i.e., the thermostat 402.
Figure 5B:
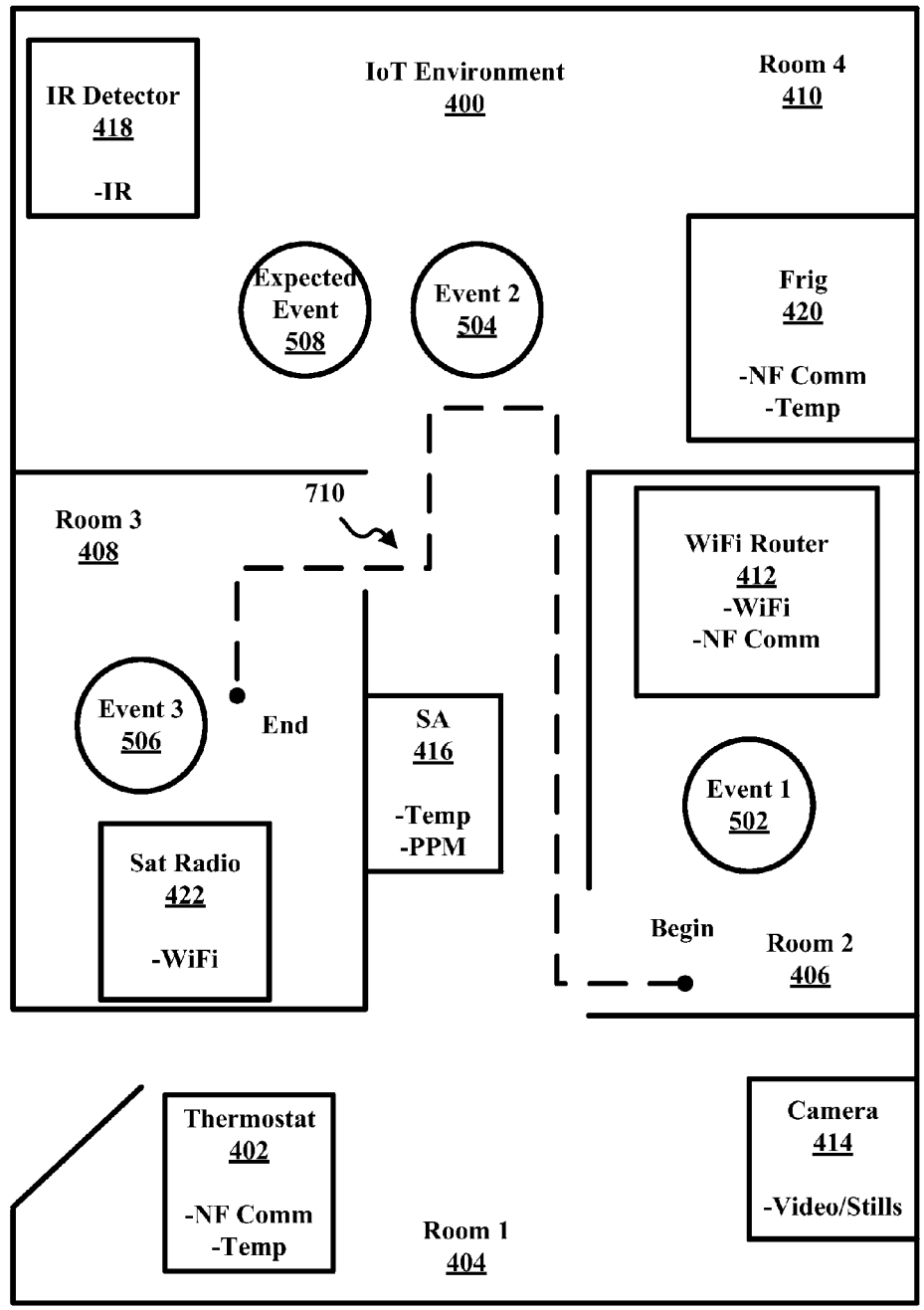

FIGS. 5A and 5B is a similar arrangement to FIG. 4A-4H and shows an example process by which a malicious user attempts to falsify reading by a new IoT device, i.e., the thermostat 402. As shown in FIG. 5A, the coordinator or the coordinator functionality in one or more of the authorized IoT devices receives event 1 502 in Room 2 406 based on a near-field communication between the WiFi Router 412 and the thermostat 402, event 2 504 based on a near-field communication between the refrigerator 420 and the thermostat 402, and event 3 in Room 3 406. The sequence of event 1 502, event 2 504, event 3 506, and expected event 508 is what the coordinator expects to receive. As shown in FIG. 5B, expected event 508 is anticipated by the coordinator due to the presence of the IR detector 418 in Room 4 410. However, since the event sequence event 1 502, event 2 504, and event 3 506 did not contain the expected event 508, the coordinator may use this inconsistency to deny entry of the thermostat 402 into the IoT environment 400.

Figure 6:
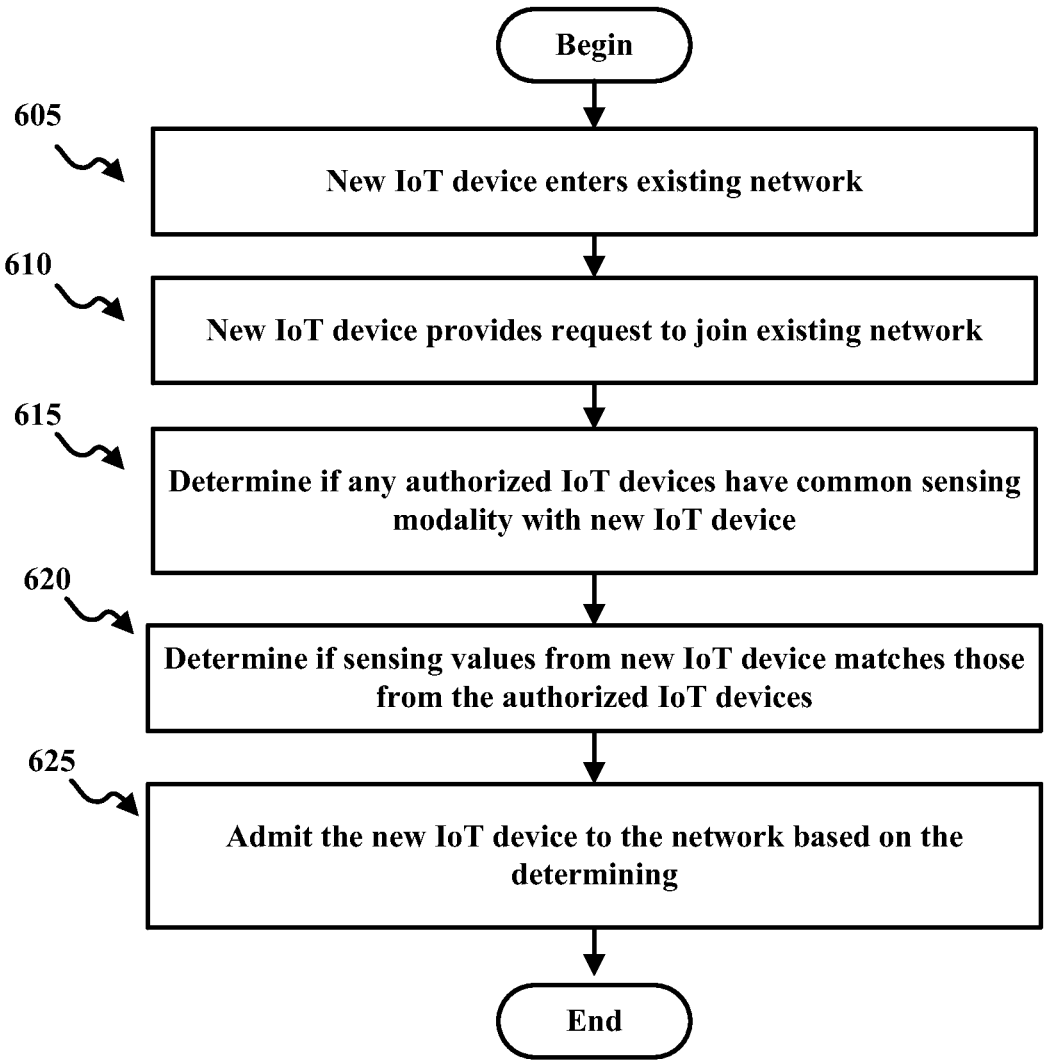
FIG. 6 is an example process 600 by which new IoT devices request admittance to an existing network, according to the present teachings.

FIG. 6 is an example process 600 by which new IoT devices request admittance to an existing network, according to the present teachings. Once the process begins, at 605 the new IoT device enters the existing network and, at 610, provides a request to join the existing network. For example, the new IoT device may have a selection mechanism, i.e., a button or a switch, to allow the new IoT device to advertise, i.e., broadcast or unicast, near-field communication, etc., a desire to join the existing network to other authorized IoT devices. The request to join can include an identifier of the new IoT device and/or information related to the new IoT device's one or more sensing modalities. At 615, upon receipt of the request from the new IoT device, one or more of the authorized IoT devices within the existing network can determine if any of the authorized IoT devices have a common sensing modality with the new IoT device. As discussed above, the existing network may have a coordinator that manages authorized IoT devices and facilities entry of new IoT devices in the existing network. The coordinator may be a separate device within the existing IoT network or can resided in one or more of the authorized IoT devices. Additionally, if the new IoT device has an associated public key or digital certificate, the new IoT device may provide that information with the request or as a separate request. At 620, if the new IoT device and one or more of the authorized IoT devices that have a common sensing modality are determined to have matching sensing values to within a particular margin of error, the new IoT device is permitted entry into the existing network at 625. In the instance that the new IoT device has provided a public key or digital certificate, that information may be stored with the coordinator or with one or more of the authorized IoT devices. If the sensing values are determined to be non-matching, then the new IoT device is denied entry into the existing network.

Figure 7:
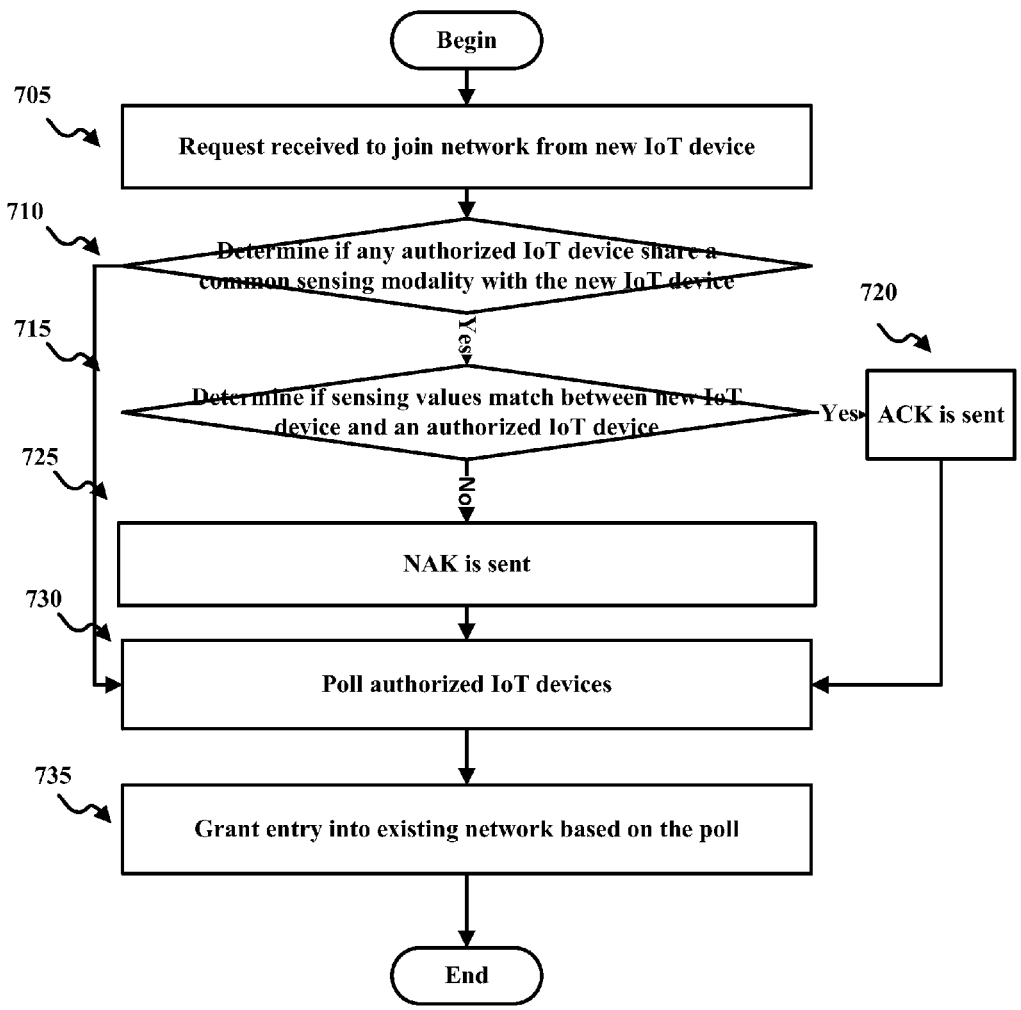
FIG. 7 is an example process 700 by which authorized IoT devices within an existing network determines admittance of new IoT devices, according to the present teachings.

FIG. 7 is an example process 700 by which authorized IoT devices within an existing network determines admittance of new IoT devices, according to the present teachings. Once the process begins, at 705 one or more of the authorized IoT devices (or coordinator) receives a join request from the new IoT device. The join request can include an identifier of the new IoT device and/or information related to the new IoT device's one or more sensing modalities. At 710, a determination is made either by the coordinator or by the one or more authorized IoT devices as to whether any of the authorized IoT devices have a common sensing modality with the new IoT device. If the determination at 710 is positive, then a determination is made at 715 as to whether common sensing values between the new IoT device and one or more of the authorized IoT devices match to within a predetermined threshold. If the result of the determination at 715 is positive, then an acknowledgement (ACK) is sent to the new IoT device at 720. If the result of the determination at 715 is negative, then a negative acknowledgement (NAK) is sent to the new IoT device at 725. If the result of the determination at 710 is negative or either the determination at 715 is either positive or negative, the one or more authorized IoT devices are polled, at 730, to determine if the new IoT device is permitted entry into the existing network. If the number of authorized IoT devices that vote in favor of allowing the new IoT device to join is greater than a predetermined threshold, then the new IoT device is granted permission to join at 735. The predetermined threshold can selected based on the desired level of security and/or ease of access desired for a particular network and can be selected to be a simple majority, greater than ⅔, etc. In the instance that a particular authorized IoT device has been granted greater rights than other IoT devices, a weighting factor can be used to allow those IoT devices with greater rights have a larger influence in the poll.

As IoT devices enter and leave the network, the capabilities of the network will continue to evolve over time. For instance, as the number of higher functioning IoT device join the network, the capabilities of the network will continue to grow. As such, the capabilities of the network will be shared to all level of devices, from the most simple of IoT devices to those with high functioning. For instance, if a new IoT device is added to a network, the capabilities of the new IoT device can be shared with each IoT device on the network. For illustration, consider that the new IoT device has a financial capability based on a digital wallet containing digital currency. For those IoT devices in the network that are suitably authorized, for example by the coordinator, the financial capability may be extended to the other IoT devices in the network. Financial transactions can be performed, for example through the coordinator, on behalf of any of the authorized IoT devices in the network. In this example, if the IoT device is low on a replenishable resource or if the IoT device itself is near end-of-life, then an order can be made, using the financial capability of the IoT device, to resupply or replace the resource or device. The coordinator or coordinator functionality may maintain a log of orders and be operable to audit the log to determine if the order that was made is still authorized. In the instance that an IoT device places an order around a time that that IoT device is removed from the network, the coordinator may modify or cancel the order.

In some aspects, the above-discussed methods can be performed based on an initialization process whereby the authorized IoT devices are mapped within a particular IoT environment. Referring again to FIG. 2A, an authorized IoT device can be used to create a map of time events representing a time interval that it takes to traverse between IoT devices within IoT environment 200. Points on the map can then be compared to data related to a new IoT device 205 to determine whether the new IoT 205 should be granted permission to join the existing network of authorized IoT devices.

For example, as the IoT device moves between from Room 1 to Room 2, the time interval to travel between Room 1 215 and Room 2 220, represented by $t_{1-2}$, can be recorded. Likewise, the time interval to travel between Room 2 220 and Room 4 230 can be represented by $t_{2-4}$, and the time interval to travel between Room 4 230 and Room 3 can be represented by $t_{4-3}$. The reverse path likewise could be assumed to correspond to the same time interval, such that the time to travel from Room 4 230 to Room 3 225 would be the same as travelling from Room 3 225 to Room 4 230. Thus, a time graph is constructed for IoT environment, where each node on the graph is represented by a particular IoT device and the distance between nodes represents a time interval that it takes to traverse a path between two nodes. The time graph need not include all possible paths between IoT devices. The coordinator 210, or any other authorized IoT device, can then use the time graph as a means to determine admittance of other IoT devices wishing to gain entry to the network.

The time interval can include a measure of uncertainty, such as +/−50%, such that any time value within or including half at one end and double at the other extreme can be considered valid. The measure of uncertainty can be selected based on a variety of factors, include the layout of the IoT environment, distances between IoT devices, etc. For example, the measure of uncertainty can be selected to vary between adjacent IoT devices, such that the value can be lower for one set of IoT devices and higher for another set of IoT devices. Continuing with this example, consider that it takes 3 minutes to travel from Room 1 215 to Room 2 200, plus or minus 30 seconds depending how fast the IoT device is moved. Then, an acceptable time interval can be from a maximum time of 3 minutes and 30 seconds to a minimum of 2 minutes and 30 seconds. Each time interval, as represented by the length between nodes on a time graph, would have a maximum and a minimum time interval.

When the new IoT device 205 enters the IoT environment, a series of time events can be created as the new IoT device 205 comes within proximity an IoT device located throughout the IoT environment 200. The series of time events can then be compared with the time graph to determine whether the new IoT device 205 should be admitted to the network. The new IoT device can start anywhere in the IoT environment and does not need to know the arrangement of the IoT devices in the IoT environment 200. For example, consider the instance where the new IoT device is turned on or is activated into a discovery mode that can be used for the authorization process. A first time event can be created in Room 4 230, due to the interaction between either or both IoT devices 205 located in that room. As the new IoT device 205 moves from Room 4 230 to Room 3 225, a time interval, $t_{Room\ 4\text{-}Room\ 3}$, can be recorded by the new IoT device 205 and/or the coordinator 210. A second time interval between Room 3 225 and Room 2 220, $t_{Room\ 3\text{-}Room\ 2}$, and a third time interval between Room 2 220 and Room 1 215, $t_{Room\ 2\text{-}Room\ 1}$, is also created. Each time interval can have an associated measure of uncertainty, as discussed above.

The first, second, and third time interval created by the new IoT device 205 can then be compared with the time graph. If all, or a subset of, the time intervals match, within the measure of uncertainty, the time intervals in the time graph, then the new IoT device can be permitted to join the network. Additionally, to add an additional layer of security, the start time for one traversal can be checked to see if that value matches an end time of a previous traversal. For example, if the start time of the traversal from Room 3 225 to Room 2 220 corresponds with an end time of the traversal from Room 4 230 to Room 3 225, then the new IoT device 205 can be shown to have moved from Room 4 230 to Room 3 225 to Room 2 220 in a continuous manner.

Figure 8:
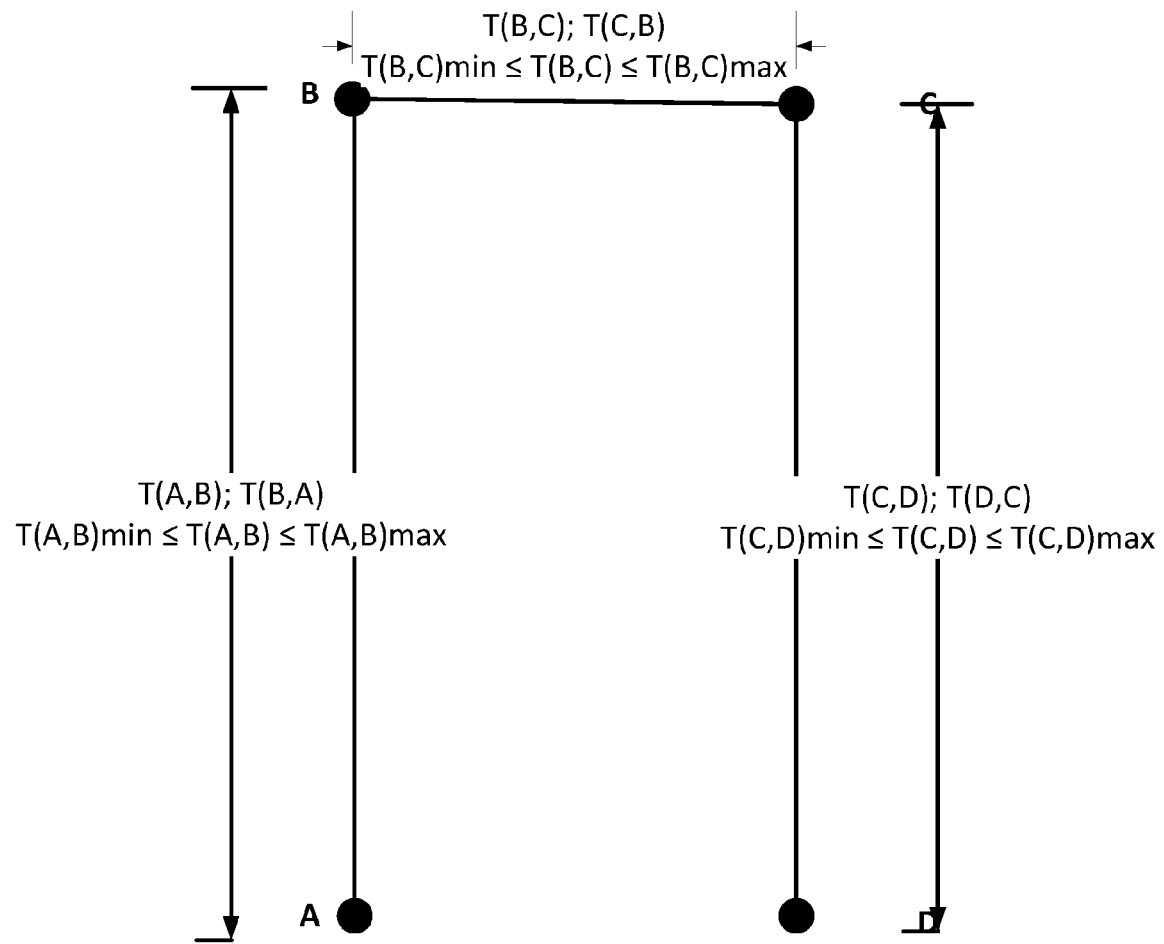
FIG. 8 illustrates an example time graph, according to the present teachings.

In some aspects, successive connected edges of the time graph can be considered in making additional edges. For instance, suppose the IoT environment has consecutive points or nodes A, B, C, D, as shown in FIG. 8, which point or node can represent a particular IoT device. The time graph, as shown, has single edges of (A-B), (B-C), (C-D). The time interval to traverse a particular edge is represented by either T(A,B) or T (B,A), since the time interval could be assumed to be the same in either direction. The time interval will be bounded by a maximum value, T(A,B)max, and a minimum value, T(A,B)min, as discussed above. Additional edges, such as (A-C), (A-D), (B-D), can also be constructed. The minimum and maximum times for these constructed edges would be the sum of the minimum or maximum times of the respective component edges. The authenticating process, as provided herein, for a device could take into account both the original edges and the constructed edges. This can allow for a stronger authentication process, as it is no longer subject to having single point detection failures that could result in the device not being authenticated. As one example, consider the time it takes to traverse contstructed edge (A-C) as the combination of traversals between nodes A to B and from B to C, which can be represented by: T(A,C) (or the reverse path (T(C,A))=T(A,B)+T(B,C). The minimum time T(A,C)min would equal T(A,B)min+T(B,C)min and the maximum time T(A,C)max would equal T(A,B)max+T(B,C)max.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 9:
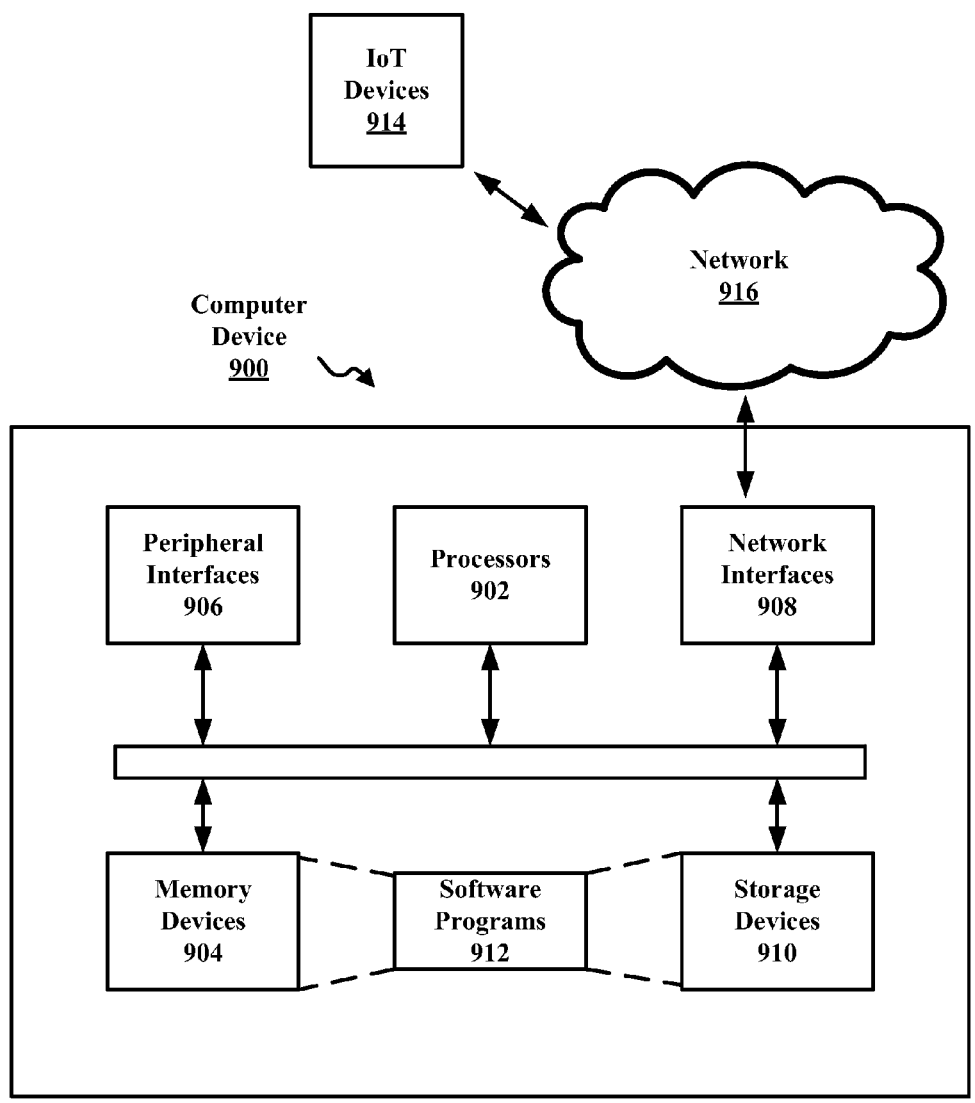
FIG. 9 illustrates an example of a hardware configuration for a computer device 800, that can be used to perform one or more of the processes of the IoT service.

For example, FIG. 9 illustrates an example of a hardware configuration for a computer device 900, that can be used to perform one or more of the processes of the IoT service described above. While FIG. 9 illustrates various components contained in the computer device 900, FIG. 9 illustrates one example of a computer device and additional components can be added and existing components can be removed.

The computer device 900 can be any type of computer devices, such as desktops, laptops, servers, etc., or mobile devices, such as smart telephones, tablet computers, cellular telephones, personal digital assistants, etc. As illustrated in FIG. 9, the computer device 900 can include one or more processors 902 of varying core configurations and clock frequencies. The computer device 900 can also include one or more memory devices 904 that serve as a main memory during the operation of the computer device 900. For example, during operation, a copy of the software that supports the IoT service can be stored in the one or more memory devices 904. The computer device 900 can also include one or more peripheral interfaces 906, such as keyboards, mice, touchpads, computer screens, touchscreens, etc., for enabling human interaction with and manipulation of the computer device 900.

The computer device 900 can also include one or more network interfaces 908 for communicating via one or more networks, such as Ethernet adapters, wireless transceivers, or serial network components, for communicating over wired or wireless media using protocols. The computer device 900 can also include one or more storage device 910 of varying physical dimensions and storage capacities, such as flash drives, hard drives, random access memory, etc., for storing data, such as images, files, and program instructions for execution by the one or more processors 902.

Additionally, the computer device 900 can include one or more software programs 912 that enable the functionality of the IoT service described above. The one or more software programs 912 can include instructions that cause the one or more processors 902 to perform the processes described herein. Copies of the one or more software programs 912 can be stored in the one or more memory devices 904 and/or on in the one or more storage devices 910. Likewise, the data, for example, DNS records, utilized by one or more software programs 912 can be stored in the one or more memory devices 904 and/or on in the one or more storage devices 910.

In implementations, the computer device 900 can communicate with one or more IoT devices 914 via a network 916. The one or more IoT devices 914 can be any types of devices as described above. The network 916 can be any type of network, such as a local area network, a wide-area network, a virtual private network, the Internet, an intranet, an extranet, a public switched telephone network, an infrared network, a wireless network, and any combination thereof. The network 916 can support communications using any of a variety of commercially-available protocols, such as TCP/IP, UDP, OSI, FTP, UPnP, NFS, CIPS, AppleTalk, and the like. The network 916 can be, for example, a local area network, a wide-area network, a virtual private network, the Internet, an intranet, an extranet, a public switched telephone network, an infrared network, a wireless network, and any combination thereof.

The computer device 900 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 900 as described above need not be enclosed within a single enclosure or even located in close proximity to one another. Those skilled in the art will appreciate that the above-described componentry are examples only, as the computer device 900 can include any type of hardware componentry, including any necessary accompanying firmware or software, for performing the disclosed implementations. The computer device 900 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method implemented by a computer for automatically admitting a device to a computer network, the method comprising:
    receiving, from the one or more authorized devices in the computer network, first data that is associated with one or more sensing modalities, wherein the one or more sensing modalities are detected by the one or more of the one or more of the authorized devices during a defined time window;
    identifying, via a processor, a new device to be admitted to the computer network;
    constructing a time sequence of proximity events of the new device, within the defined time window, based on the first data, wherein each proximity event is associated with a physical proximity between the new device and at least one of the one or more sensing modalities;
    determining that the time sequence of the proximity events matches an expected time sequence of expected proximity events; and
    admitting the new device to the computer network based on the determining.

2. The method of claim 1, further comprising:
    receiving, from the new device, second data associated with the one or more sensing modalities associated with the new device during the defined time window.

3. The method of claim 2, wherein the time sequence of proximity events of the new device comprises the second data.

4. The method of claim 2, wherein the constructing the time sequence of proximity events of the new device further comprises determining a path through a physical location associated with the computer network, wherein a physical location of the one or more authorized devices in the computer network forms the path.

5. The method of claim 4, wherein determining the path is based on the first data and the second data.

6. The method of claim 1, further comprising:
determining, after a time period, that the new device has not remained in proximity to the physical location of the computer network; and
removing the new device from the computer network.

7. The method of claim 1, wherein the one or more modalities comprise temperature, visual, audio, heat, motion, particulate concentration.

8. The method of claim 5, wherein determining the path comprises:
comparing a portion of the second data from the new device to a portion of the first data from one of the one or more authorized devices; and
determining, based on the comparison, a location of the new device relative to the one of the one or more authorized devices.

9. The method of claim 1, wherein the identifying the new device to be admitted to the computer network, further comprises:
receiving a network discovery signal from the new device; and
providing an activation signal to the one or more authorized device to enter into a data capture mode.

10. The method of claim 1, wherein the first data comprises individual sensing data from the one or more authorized devices.

11. The method of claim 1, wherein the individual sensing data comprises a time value that a particular sensing data was acquired.

12. The method of claim 1, further comprising;
ranking the one or more authorized devices based on a characteristic of the one or more devices; and
assigning a weighting factor based on the ranking, where authorized device with a higher rank are assigned a higher weighting factor,
wherein the determining that the time sequence of the proximity events matches the expected time sequence of expected proximity events is based on the weighting factor that is assigned.

13. The method of claim 12, wherein the characteristic comprises a number of different sensing modalities, an authentication with a trusted entity.

14. The method of claim 1, wherein the determining that the time sequence of the proximity events matches the expected time sequence of expected proximity events is based on a predetermined matching threshold of corroborating authorized devices.

15. The method of claim 1, wherein the determining that the time sequence of the proximity events matches the expected time sequence of expected of proximity events is based on proximity information received using a near-field communication protocol between the new device and one of the one or more authorized devices.

16. A computing device for automatically admitting a device to a computer network, the computing device comprising:
a memory that includes a software application; and
a processor, operably connected to the memory, wherein, when the processor executes software application, the processor is configured to:
receiving, from the one or more authorized devices in the computer network, first data that is associated with one or more sensing modalities, wherein the one or more sensing modalities are detected by the one or more of the one or more of the authorized devices during a defined time window;
identifying a new device to be admitted to the computer network;
constructing a time sequence of proximity events of the new device, within the defined time window, based on the first data, wherein each proximity event is associated with a physical proximity between the new device and at least one of the one or more sensing modalities;
determining that the time sequence of the proximity events matches an expected time sequence of expected proximity events; and
admitting the new device to the computer network based on the determining.

17. The device of claim 16, wherein the at least one processor is further operable to execute instructions comprising:
receiving, from the new device, second data associated with the one or more sensing modalities associated with the new device during the defined time window.

18. The device of claim 17, wherein the time sequence of proximity events of the new device comprises the second data.

19. The device of claim 17, wherein the constructing the time sequence of proximity events of the new device further comprises determining a path through a physical location associated with the computer network, wherein a physical location of the one or more authorized devices in the computer network forms the path.

20. The device of claim 19, wherein determining the path is based on the first data and the second data.

21. The device of claim 16, wherein the at least one processor is further operable to execute instructions comprising:
determining, after a time period, that the new device has not remained in proximity to the physical location of the computer network; and
removing the new device from the computer network.

22. The device of claim 16, wherein the one or more modalities comprise temperature, visual, audio, heat, motion, particulate concentration.

23. The device of claim 20, wherein determining the path comprises:
comparing a portion of the second data from the new device to a portion of the first data from one of the one or more authorized devices; and
determining, based on the comparison, a location of the new device relative to the one of the one or more authorized devices.

24. The device of claim 16, wherein the identifying the new device to be admitted to the computer network, further comprises:
receiving a network discovery signal from the new device; and
providing an activation signal to the one or more authorized device to enter into a data capture mode.

25. The device of claim 16, wherein the first data comprises individual sensing data from the one or more authorized devices.

26. The device of claim 16, wherein the individual sensing data comprises a time value that a particular sensing data was acquired.

27. The device of claim 16, wherein the at least one processor is further operable to execute instructions comprising:
ranking the one or more authorized devices based on a characteristic of the one or more devices; and assigning a weighting factor based on the ranking, where authorized device with a higher rank are assigned a higher weighting factor, wherein the determining that the time sequence of the proximity events matches the expected time sequence of expected proximity events is based on the weighting factor that is assigned.

28. The device of claim 27, wherein the characteristic comprises a number of different sensing modalities, an authentication with a trusted entity.

29. The device of claim 16, wherein the determining that the time sequence of the proximity events matches the expected time sequence of expected proximity events is based on a predetermined matching threshold of corroborating authorized devices.

30. The device of claim 16, wherein the determining that the time sequence of the proximity events matches the expected time sequence of expected proximity events is based on proximity information received using a near-field communication protocol between the new device and one of the one or more authorized devices.

31. A computer readable storage medium comprising instructions for causing one or more processors to perform a method, the method of automatically admitting a device to a computer network comprising:

receiving, from the one or more authorized devices in the computer network, first data that is associated with one or more sensing modalities, wherein the one or more sensing modalities are detected by the one or more of the one or more of the authorized devices during a defined time window;

identifying a new device to be admitted to the computer network;

constructing a time sequence of proximity events of the new device, within the defined time window, based on the first data, wherein each proximity event is associated with a physical proximity between the new device and at least one of the one or more sensing modalities;

determining that the time sequence of the proximity events matches an expected time sequence of expected proximity events; and admitting the new device to the computer network based on the determining.

32. A method implemented on a computer for admitting a new device to a computer network, the method comprising:

receiving, from the new device, a first series of time interval data based on a time traversal interval between authorized devices in the computer network;

comparing, via a processor, at least a portion of the first series of time interval data with a predetermined second series of time interval data;

determining that the at least a portion of the first series of time interval data matches the predetermined second series of time interval data; and admitting the new device to the computer network based on the determining.

* * * * *

UNITED STATES PATENT AND TRADEMARK OFFICE
CERTIFICATE OF CORRECTION

| | | |
|---|---|---|
| PATENT NO. | : 9,633,197 B2 | Page 1 of 1 |
| APPLICATION NO. | : 14/640489 | |
| DATED | : April 25, 2017 | |
| INVENTOR(S) | : Ashvatth Lakshmanan, Eric Osterweil and Andrew Fregly | |

It is certified that error appears in the above-identified patent and that said Letters Patent is hereby corrected as shown below:

In the Claims

Column 17, Claim 15, Line 51, delete "of" after expected.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*